US012033286B2

(12) United States Patent
Kawamae et al.

(10) Patent No.: US 12,033,286 B2
(45) Date of Patent: Jul. 9, 2024

(54) AUGMENTED REALITY DISPLAY DEVICE AND AUGMENTED REALITY DISPLAY METHOD

(71) Applicant: Maxell, Ltd., Kyoto (JP)

(72) Inventors: Osamu Kawamae, Kyoto (JP); Masuo Oku, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 17/967,934

(22) Filed: Oct. 18, 2022

(65) Prior Publication Data

US 2023/0045016 A1 Feb. 9, 2023

Related U.S. Application Data

(63) Continuation of application No. 17/298,688, filed as application No. PCT/JP2018/044358 on Dec. 3, 2018, now Pat. No. 11,508,134.

(51) Int. Cl.
*G06T 19/00* (2011.01)
*G06V 20/20* (2022.01)

(52) U.S. Cl.
CPC ............ *G06T 19/006* (2013.01); *G06V 20/20* (2022.01)

(58) Field of Classification Search
CPC .... G06T 19/006; G06V 20/20; G06V 10/147; G06F 3/0481
See application file for complete search history.

(56) References Cited

U.S. PATENT DOCUMENTS

| 6,167,353 | A | * | 12/2000 | Piernot | G06F 3/0425 463/40 |
| 8,189,864 | B2 | | 5/2012 | Kojo | |
| 8,570,320 | B2 | * | 10/2013 | Izadi | G06T 17/00 345/420 |
| 9,008,371 | B2 | | 4/2015 | Meier | |

(Continued)

FOREIGN PATENT DOCUMENTS

| JP | 2003-141574 A | 5/2003 |
| JP | 2007-188332 A | 7/2007 |

(Continued)

OTHER PUBLICATIONS

International Search Report of PCT/JP2018/044358 dated Feb. 5, 2019.

*Primary Examiner* — Motilewa Good-Johnson
(74) *Attorney, Agent, or Firm* — Mattingly & Malur, PC

(57) ABSTRACT

An augmented reality (AR) display device includes a camera that captures a background image; a distance measuring sensor that measures a distance to a real object in the background image; a position and orientation sensor that detects the position of the camera and the shooting direction of the camera; a controller that recognizes the real object from the background image captured by the camera and associates the predetermined AR object with the recognized real object; a display displaying an image of the associated AR object; and a memory that stores data of the real object and the AR object associated with each other. The controller determines whether or not the real object is movable from the measurement result of the distance measuring sensor, and arranges the AR object according to the current position of the real object when the position of the real object associated with the AR object moves.

8 Claims, 29 Drawing Sheets

(56) References Cited

U.S. PATENT DOCUMENTS

| | | | |
|---|---|---|---|
| 9,971,853 B2* | 5/2018 | Jovanovic | G06T 15/20 |
| 10,037,465 B2 | 7/2018 | Goslin | |
| 10,573,018 B2* | 2/2020 | Kutliroff | G06T 7/50 |
| 10,593,114 B2 | 3/2020 | Yamauchi | |
| 11,256,243 B2 | 2/2022 | Cella | |
| 2008/0166022 A1* | 7/2008 | Hildreth | G06T 7/254 |
| | | | 382/107 |
| 2008/0284864 A1 | 11/2008 | Kotake et al. | |
| 2009/0257730 A1* | 10/2009 | Chen | H04N 1/00244 |
| | | | 386/278 |
| 2010/0289817 A1* | 11/2010 | Meier | G06T 15/20 |
| | | | 345/619 |
| 2013/0278633 A1 | 10/2013 | Ahn | |
| 2015/0123966 A1 | 5/2015 | Newman | |
| 2017/0109929 A1 | 4/2017 | Meier | |
| 2017/0257594 A1 | 9/2017 | Goslin | |
| 2018/0004286 A1 | 1/2018 | Chen | |
| 2020/0160566 A1 | 5/2020 | Moench | |
| 2020/0302664 A1* | 9/2020 | Lee | G06T 11/001 |
| 2021/0165484 A1 | 6/2021 | Suguhara | |
| 2021/0375052 A1 | 12/2021 | Abiko | |
| 2023/0252744 A1* | 8/2023 | Miller | G06F 3/013 |
| | | | 345/8 |

FOREIGN PATENT DOCUMENTS

| | | | |
|---|---|---|---|
| JP | 2008-46750 A | | 2/2008 |
| JP | 2014-131094 A | | 7/2014 |
| JP | 2015-143976 A | | 8/2015 |
| JP | 2018-147151 A | | 9/2018 |
| KR | 20190093979 A | * | 8/2019 |

\* cited by examiner

F I G. 1 A
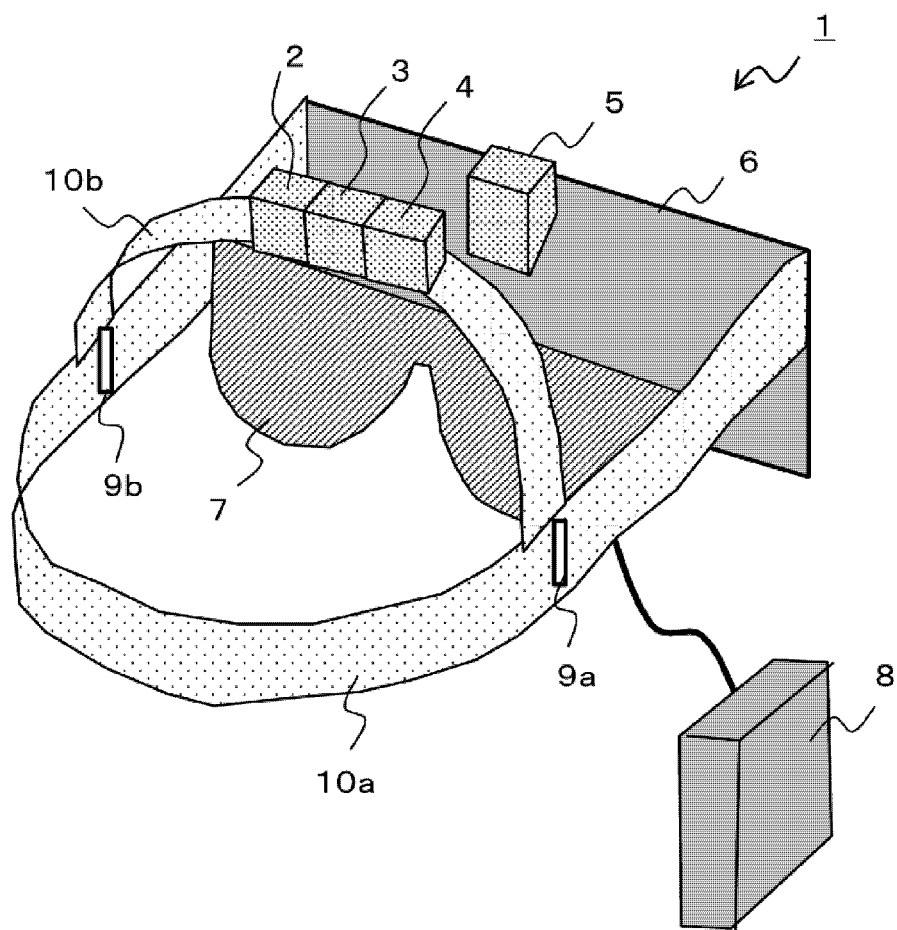

F I G. 1 B
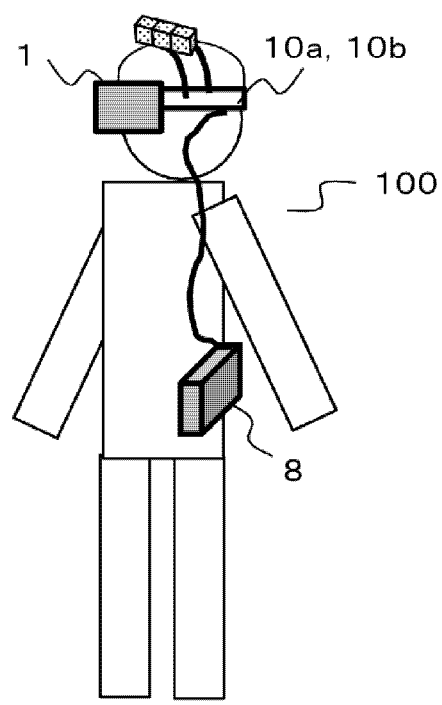

F I G. 3 A
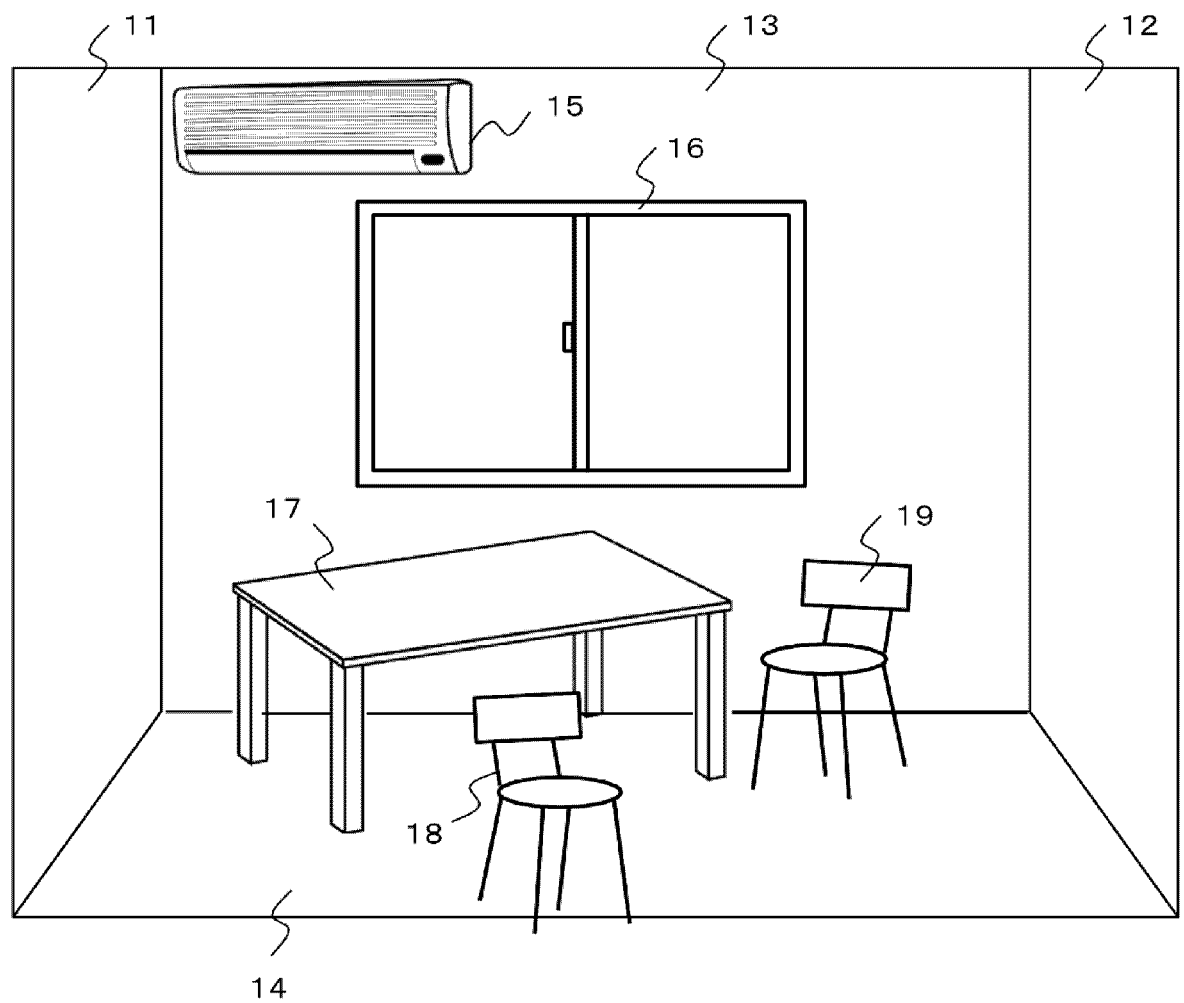

F I G. 3 B
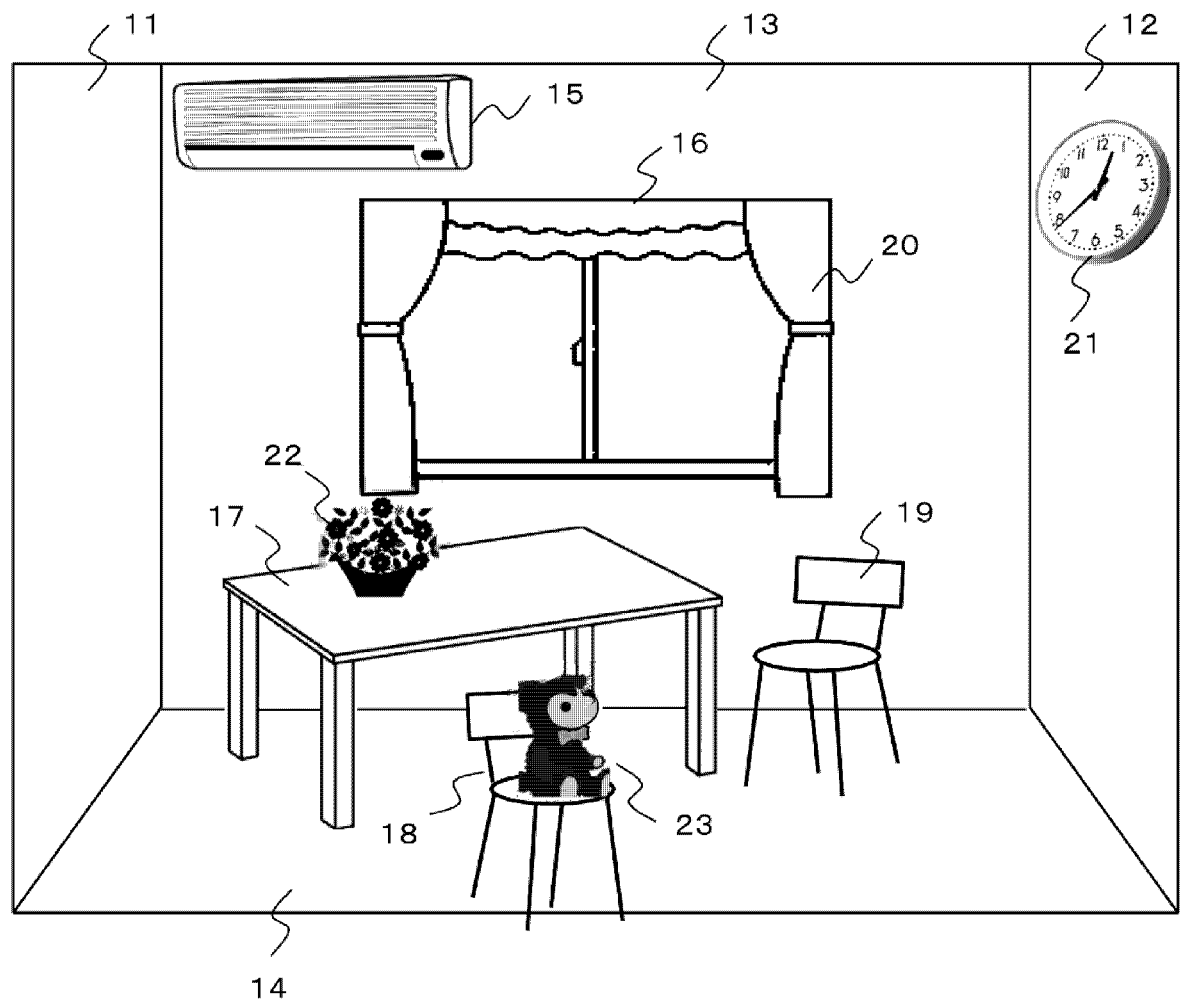

F I G. 3 D
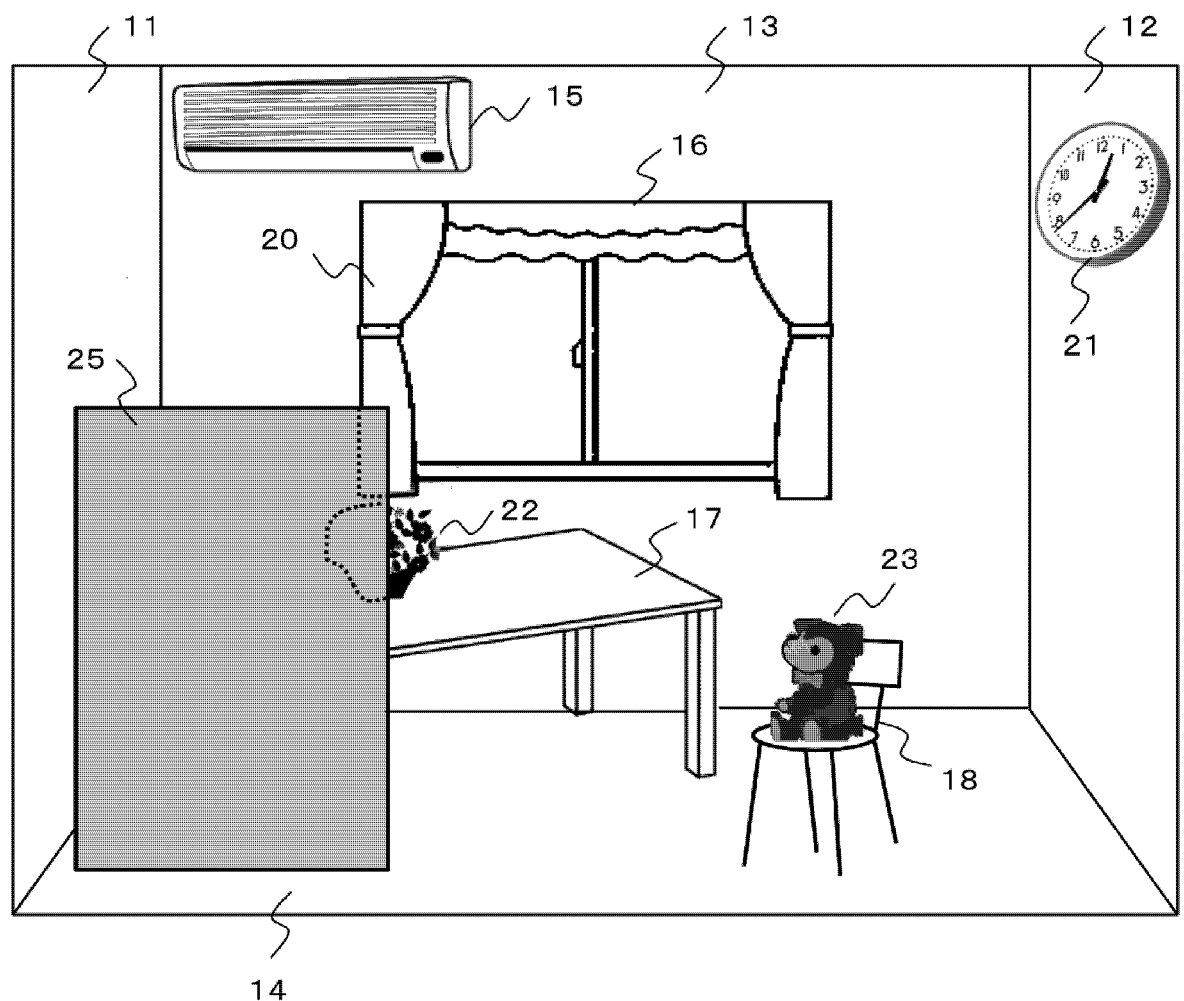

LINE OF SIGHT 26a   LINE OF SIGHT 26b

IN CASE OF LINE OF SIGHT 26a

IN CASE OF LINE OF SIGHT 26b

F I G. 7
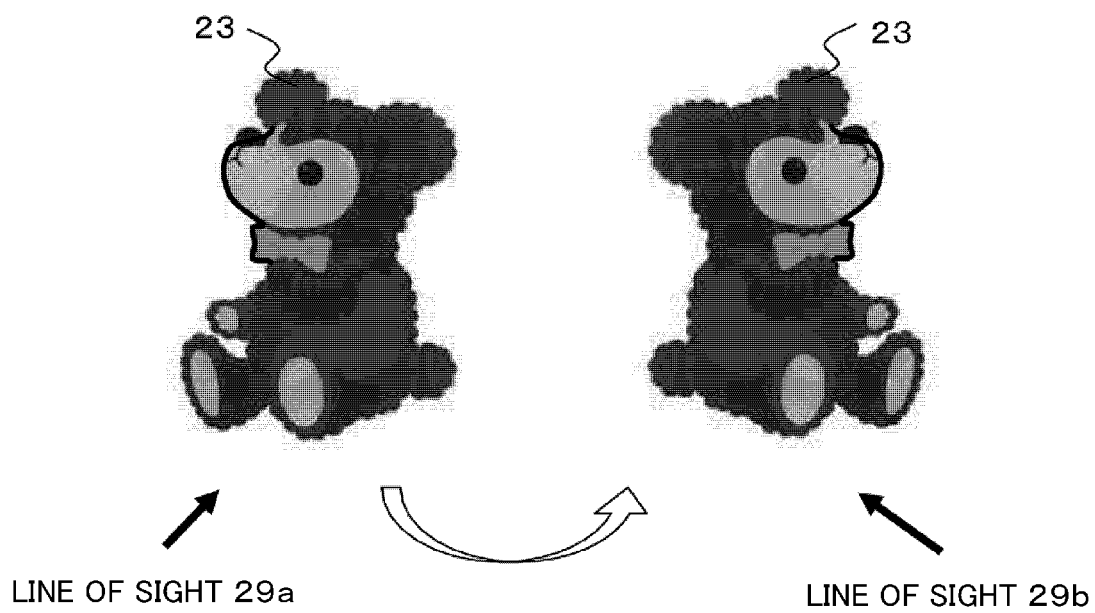
LINE OF SIGHT 29a        LINE OF SIGHT 29b

F I G. 1 6

| CONTENT ID | 550e8400-e29b-41d4-a716-446655440000 |
|---|---|
| CONTENT TYPE | HEADER |
| CONTENT NAME | AR EXPERIENCE |
| CONTENT OWNER | ABC COMPANY |
| COPYRIGHT | FOR REPRODUCTION ONLY, REUSE PROHIBITED |
| ADDITIONAL CONTENT | REFERENCE POINT AND MOVEMENT HISTORY DATA ○ |
| | CAPTURED OBJECT DATA ○ |
| | BACKGROUND OBJECT DATA ○ |
| | CAPTURED OBJECT GROUP DATA |
| | AR OBJECT DATA ○ |

F I G. 1 7

| CONTENT ID | 550e8400-e29b-41d4-a716-446655440000 | | |
|---|---|---|---|
| CONTENT TYPE | REFERENCE POINT AND MOVEMENT HISTORY DATA | | |
| REFERENCE POINT (WITH TIME) | T0=20181123T092736+0900 | PBase={(0, 0, 0), (0, 0)} | |
| MOVEMENT HISTORY (WITH TIME) | T1=20181123T092912+0900 | MP1={(r1, $\theta$1, $\phi$1), ($\theta\theta$1, $\phi\phi$1)} | |
| | T2=20181123T093052+0900 | MP2={(r2, $\theta$2, $\phi$2), ($\theta\theta$2, $\phi\phi$2)} | |

F I G. 1 8 A

| CONTENT ID | 550e8400-e29b-41d4-a716-446655440000 | | |
|---|---|---|---|
| CONTENT TYPE | CAPTURED OBJECT DATA | | |
| SHOOTING POSITION | REFERENCE POSITION (PBase) | | |
| CAPTURED OBJECT 1 | OBJECT NAME=TABLE | MOVEMENT FLAG=X | |
| FEATURE POINT 1 | DISTANCE=R1 | DIRECTION=($\theta\theta 3$, $\Phi\Phi 3$) | |
| FEATURE POINT 2 | DISTANCE=R2 | DIRECTION=($\theta\theta 4$, $\Phi\Phi 4$) | |
| ⋮ | ⋮ | ⋮ | |
| ASSOCIATED AR OBJECT 1 | DATA ID=abhk.good.xxz.3052 | | |
| ASSOCIATED POSITION | FEATURE POINT 2 | OFFSET=(r3, $\theta 3$, $\Phi 3$) | |
| SIZE | ×1.5 | | |
| ROTATION | ($\theta\theta 5$, $\Phi\Phi 5$) | | |
| CAPTURED OBJECT 2 | OBJECT NAME=CHAIR 1 | MOVEMENT FLAG=X | GROUP 1 |
| FEATURE POINT 1 | DISTANCE=R3 | DIRECTION=($\theta\theta 6$, $\Phi\Phi 6$) | |
| ⋮ | ⋮ | ⋮ | |
| ASSOCIATED AR OBJECT 2 | DATA ID=xxxx.yyyy.zzzz.1368 | | |
| ASSOCIATED POSITION | FEATURE POINT 1 | OFFSET=(r4, $\theta 4$, $\Phi 4$) | |
| SIZE | ×1.5 | | |
| ROTATION | ($\theta\theta 7$, $\Phi\Phi 7$) | | |
| CAPTURED OBJECT 3 | OBJECT NAME=CHAIR 2 | MOVEMENT FLAG=X | GROUP 1 |
| FEATURE POINT 1 | DISTANCE=R4 | DIRECTION=($\theta\theta 8$, $\Phi\Phi 8$) | |
| ⋮ | ⋮ | ⋮ | |
| ⋮ | ⋮ | ⋮ | |

F I G. 1 8 B

| CONTENT ID | 550e8400-e29b-41d4-a716-446655440000 | | |
|---|---|---|---|
| CONTENT TYPE | CAPTURED OBJECT DATA | | |
| SHOOTING POSITION | MOVEMENT POSITION (MP1) | | |
| CAPTURED OBJECT 1 | OBJECT NAME=TABLE | MOVEMENT FLAG=0 | |
| FEATURE POINT 1 | DISTANCE=R1a | DIRECTION=($\theta\theta$3a, $\Phi\Phi$3a) | |
| FEATURE POINT 2 | DISTANCE=R2a | DIRECTION=($\theta\theta$4a, $\Phi\Phi$4a) | |
| ⋮ | ⋮ | ⋮ | |
| ASSOCIATED AR OBJECT 1 | DATA ID=abhk.good.xxz.3052 | | |
| ASSOCIATED POSITION | FEATURE POINT 2 | OFFSET=(r3a, $\theta$3a, $\Phi$3a) | |
| SIZE | ×1.5 | | |
| ROTATION | ($\theta\theta$5a, $\Phi\Phi$5a) | | |
| CAPTURED OBJECT 2 | OBJECT NAME=CHAIR 1 | MOVEMENT FLAG=1 | GROUP 1 |
| FEATURE POINT 1 | DISTANCE=R3a | DIRECTION=($\theta\theta$6a, $\Phi\Phi$6a) | |
| ⋮ | ⋮ | ⋮ | |
| ASSOCIATED AR OBJECT 2 | DATA ID=xxxx.yyyy.zzzz.1368 | | |
| ASSOCIATED POSITION | FEATURE POINT 1 | OFFSET=(r4a, $\theta$4a, $\Phi$4a) | |
| SIZE | ×1.5 | | |
| ROTATION | ($\theta\theta$7a, $\Phi\Phi$7a) | | |
| ⋮ | ⋮ | ⋮ | |

F I G. 1 8 C

| CONTENT ID | 550e8400-e29b-41d4-a716-446655440000 | | |
|---|---|---|---|
| CONTENT TYPE | CAPTURED OBJECT DATA | | |
| SHOOTING POSITION | MOVEMENT POSITION (MP2) | | |
| CAPTURED OBJECT 1 | OBJECT NAME=TABLE | MOVEMENT FLAG=0 | |
| FEATURE POINT 1 | DISTANCE=R1b | DIRECTION=($\theta\theta$3b, $\Phi\Phi$3b) | |
| FEATURE POINT 2 | DISTANCE=R2b | DIRECTION=($\theta\theta$4b, $\Phi\Phi$4b) | |
| ⋮ | ⋮ | ⋮ | |
| ASSOCIATED AR OBJECT 1 | DATA ID = abhk.good.xxz.3052 | | |
| ASSOCIATED POSITION | FEATURE POINT 2 | OFFSET=(r3b, $\theta$3b, $\Phi$3b) | |
| SIZE | ×1.5 | | |
| ROTATION | ($\theta\theta$5, $\Phi\Phi$5) | | |
| CAPTURED OBJECT 2 | OBJECT NAME=CHAIR 1 | MOVEMENT FLAG=0 | GROUP 1 |
| FEATURE POINT 1 | DISTANCE=R3b | DIRECTION=($\theta\theta$6b, $\Phi\Phi$6b) | |
| ⋮ | ⋮ | ⋮ | |
| ASSOCIATED AR OBJECT 2 | DATA ID=xxxx.yyyy.zzzz.1368 | | |
| ASSOCIATED POSITION | FEATURE POINT 1 | OFFSET=(r4b, $\theta$4b, $\Phi$4b) | |
| SIZE | ×1.5 | | |
| ROTATION | ($\theta\theta$7, $\Phi\Phi$7) | | |
| CAPTURED OBJECT 4 | OBJECT NAME=PARTITION | MOVEMENT FLAG=1 | |
| FEATURE POINT 1 | DISTANCE=R5 | DIRECTION=($\theta\theta$9, $\Phi\Phi$9) | |
| ⋮ | ⋮ | ⋮ | |
| ⋮ | ⋮ | ⋮ | |

F I G. 1 9

| CONTENT ID | 550e8400-e29b-41d4-a716-446655440000 | |
|---|---|---|
| CONTENT TYPE | BACKGROUND OBJECT DATA | |
| SHOOTING POSITION | REFERENCE POSITION (PBase) | |
| BACKGROUND OBJECT 1 | OBJECT NAME=ROOM | |
| FEATURE POINT 1 | DISTANCE=R6 | DIRECTION=($\theta\theta$a, $\Phi\Phi$a) |
| FEATURE POINT 2 | DISTANCE=R7 | DIRECTION=($\theta\theta$b, $\Phi\Phi$b) |
| ⋮ | ⋮ | ⋮ |
| BACKGROUND DATA | BITMAP DATA | |
| ASSOCIATED AR OBJECT 1 | DATA ID=xxxx.yyyy.xyz.1114 | |
| ASSOCIATED POSITION | FEATURE POINT 1 | OFFSET=(r3c, $\theta$3c, $\Phi$3c) |
| SIZE | ×1.5 | |
| ROTATION | ($\theta\theta$d, $\Phi\Phi$d) | |
| SHOOTING POSITION | MOVEMENT POSITION (MP1) | |
| BACKGROUND OBJECT 1 | OBJECT NAME=ROOM | |
| FEATURE POINT 1 | DISTANCE=R8 | DIRECTION = ($\theta\theta$e, $\Phi\Phi$e) |
| ⋮ | ⋮ | ⋮ |

F I G. 2 0

| CONTENT ID | 550e8400-e29b-41d4-a716-446655440000 |
|---|---|
| CONTENT TYPE | AR OBJECT DATA |
| AR OBJECT 1 | DATA ID=abhk.good.xxz.3052 |
| | TITLE=VASE |
| | DESCRIPTION OF COPYRIGHT |
| | 3D IMAGE DATA |
| AR OBJECT 2 | DATA ID=xxxx.yyyy.zzzz.1368 |
| | TITLE=STUFFED ANIMAL |
| | DESCRIPTION OF COPYRIGHT |
| | 3D IMAGE DATA |
| AR OBJECT 3 | DATA ID=xxxx.yyyy.xyz.1114 |
| | TITLE=CLOCK |
| | DESCRIPTION OF COPYRIGHT |
| | 3D IMAGE DATA |
| ⋮ | ⋮ |
| AR OBJECT 7 | DATA ID=abcz.yyyy.xyz.8012 |
| | TITLE = DRONE |
| | DESCRIPTION OF COPYRIGHT |
| | 3D IMAGE DATA |
| | MOVEMENT PROFILE |
| ⋮ | ⋮ |

F I G. 2 1

| CONTENT ID | 550e8400-e29b-41d4-a716-446655440000 | |
|---|---|---|
| CONTENT TYPE | CAPTURED OBJECT GROUP DATA | |
| GROUP 1 | OBJECT NAME=CHAIR | |
| CONSTITUENT OBJECT | CAPTURED OBJECT 2 | PRIORITY=1 |
| | CAPTURED OBJECT 3 | PRIORITY=2 |
| ASSOCIATED AR OBJECT 1 | DATA ID=abhk.good.xxz.3052 | |
| ASSOCIATED OBJECT | CAPTURED OBJECT 2 | |
| ASSOCIATED POSITION | FEATURE POINT 1 | OFFSET=(r5, $\theta$5, $\Phi$5) |
| SIZE | ×1.5 | |
| ROTATION | ($\theta\theta$f, $\Phi\Phi$f) | |
| GROUP 2 | OBJECT NAME=xxxxx | |
| CONSTITUENT OBJECT | ⋮ | ⋮ |

F I G. 2 2
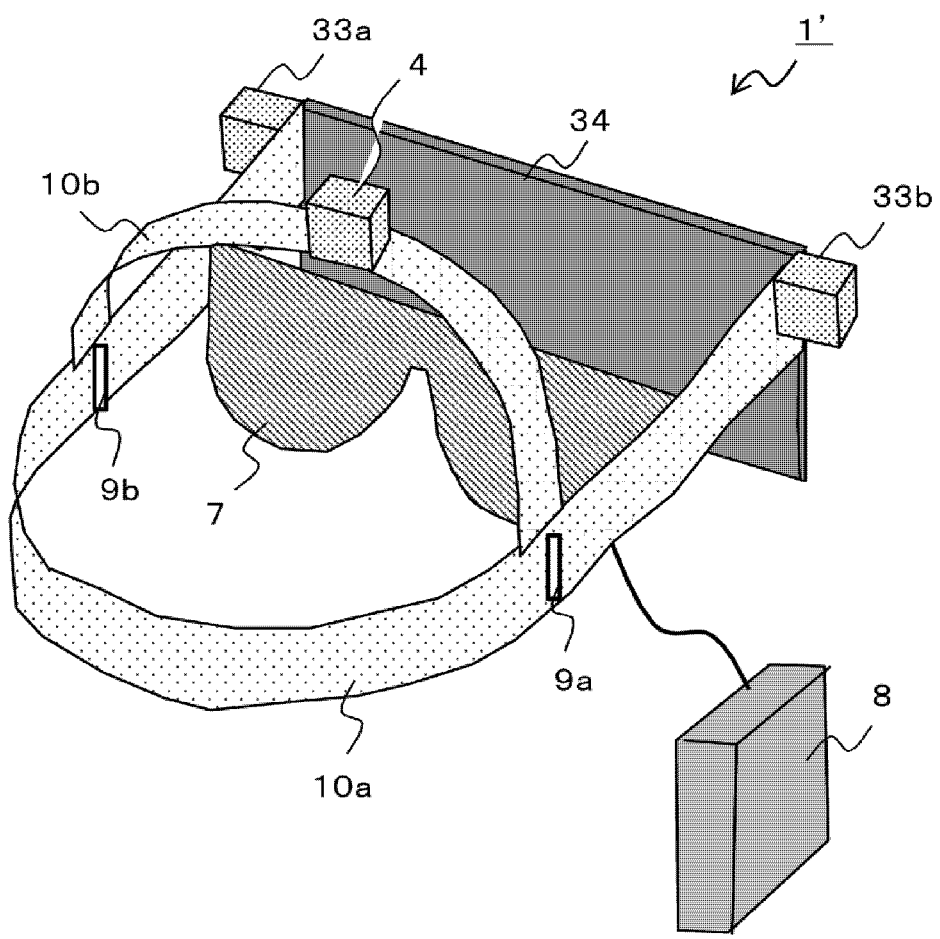

AUGMENTED REALITY DISPLAY DEVICE AND AUGMENTED REALITY DISPLAY METHOD

TECHNICAL FIELD

The present invention relates to an augmented reality display device and an augmented reality display method for displaying an augmented reality object (hereinafter, AR object) so as to overlap a background image.

BACKGROUND ART

An augmented reality display device (AR display device), such as a head mounted display (hereinafter, HMD), displays an AR object created by computer graphics (CG) or the like so as to overlap a background image (real space) captured by a camera, and is used in the field of content display, such as game display and maintenance work. At this time, in order to add an AR object, an image called an AR trigger or a mark is captured at the same time as the background with a camera, and the AR object is combined with the background image using the AR trigger as a clue. Alternatively, a method called markless AR, in which feature points are extracted from a camera image to perform image recognition and an AR object is added to a specific object, is also known.

In addition, there are the following proposals regarding when to display the AR object. In Patent Document 1, the observation conditions and the position and posture of an observer observing a virtual space (virtual object) are recorded, and then a virtual window is arranged in the virtual space, and it is determined whether or not the position and posture relationship between the virtual window and the viewpoint satisfies the specified conditions. Then, it is disclosed that, when the specified conditions are satisfied, an image of a virtual space (virtual object) in which the observation conditions and the position and posture at the time of recording are restored is output. In Patent Document 2, a distance between the position of a virtual object, which is displayed following a movable real object in the real space, and another object in the virtual space or the real space is calculated. Then, it is disclosed that, when the distance is equal to or less than a threshold value, the transparency of a part or the entirety of at least either the image of the virtual object or another object is controlled.

CITATION LIST

Patent Document

Patent Document 1: JP 2007-188332 A
Patent Document 2: JP 2015-143976 A

SUMMARY OF THE INVENTION

Problems to be Solved by the Invention

When a user wears an HMD and an AR object is arranged in a space, the user recognizes an object (for example, furniture) in the space, and the AR object is arranged together with the absolute coordinates in the space. However, when reproducing the AR object in the space later, the arrangement of the object (furniture) in the space may be different. In this case, since the current space is recognized as another space or the distance relationship between the front and back is different from the previous arrangement, the AR object cannot be arranged at an appropriate position. As a result, there is a problem that the user who observes this is uncomfortable or confused.

In Patent Document 1, the arrangement of an AR object for a moving object is not considered. In addition, in Patent Document 2, a moving object is targeted, but the virtual object is displayed when the distance between the object and the virtual object is short. For this reason, if the arrangement of the objects is changed, the virtual object cannot be displayed.

In view of the aforementioned problems, it is an object of the present invention to provide an augmented reality display device and an augmented reality display method for appropriately displaying an AR object according to the current position of an object including a movable object.

Solutions to Problems

An augmented reality display device of the present invention includes: a camera that captures a background image; a distance measuring sensor that measures a distance to a real object in the background image; a position and orientation sensor that detects a position and a shooting direction of the camera; a controller that recognizes the real object from the background image captured by the camera and associates the predetermined AR object with the recognized real object; a display that displays an image of the associated AR object; and a memory that stores data of the real object and the AR object associated with each other. Here, the controller determines whether or not the real object is movable from a measurement result of the distance measuring sensor, and arranges the AR object according to a current position of the real object when a position of the real object associated with the AR object moves.

In addition, an augmented reality display method of the present invention includes: a step of capturing a background image and recognizing a real object from the captured background image; a step of measuring a distance to the real object in the background image; a step of detecting a shooting position and a shooting direction of the background image; a step of associating the predetermined AR object with the recognized real object; a step of recognizing that the object is a movable object by detecting that the real object has moved; and a step of displaying an image of the associated AR object. Here, in the step of displaying the image of the AR object, when a position of the real object associated with the AR object moves, the AR object is arranged according to a current position of the real object.

Effects of the Invention

According to the present invention, since the AR object can be appropriately displayed according to the current position of the object including a movable object, the user can comfortably observe the AR object without a sense of discomfort given to the user observing the AR object.

BRIEF DESCRIPTION OF THE DRAWINGS

FIG. 1A is a diagram showing the appearance of an augmented reality display device (AR display device) according to a first embodiment.

FIG. 1B is a diagram showing a state in which a user is wearing an AR display device.

FIG. 3A is a diagram showing an example of an image captured by a camera.

FIG. 3B is a diagram showing an example of a display image in which AR objects are combined.

FIG. 3D is a diagram showing an example of a display image when a partition is added to a real space.

FIG. 5B is a diagram showing a method of recognition when the user's line-of-sight direction is a direction of reference numeral 26a.

FIG. 7 is a diagram showing a display example of an AR object linked to the line of sight.

FIG. 16 is a diagram showing an example of a data table of header data.

FIG. 17 is a diagram showing an example of a data table of reference point and movement history data 891.

FIG. 18A is a diagram showing an example of a data table of captured object data 892.

FIG. 18B is a diagram showing an example of a data table of the captured object data 892.

FIG. 18C is a diagram showing an example of a data table of the captured object data 892.

FIG. 19 is a diagram showing an example of a data table of background object data 893.

FIG. 20 is a diagram showing an example of a data table of AR object data 894.

FIG. 21 is a diagram showing an example of a data table of captured object group data 895.

FIG. 22 is a diagram showing the appearance of an augmented reality display device (AR display device) according to a second embodiment.

MODE FOR CARRYING OUT THE INVENTION

Figure 2:
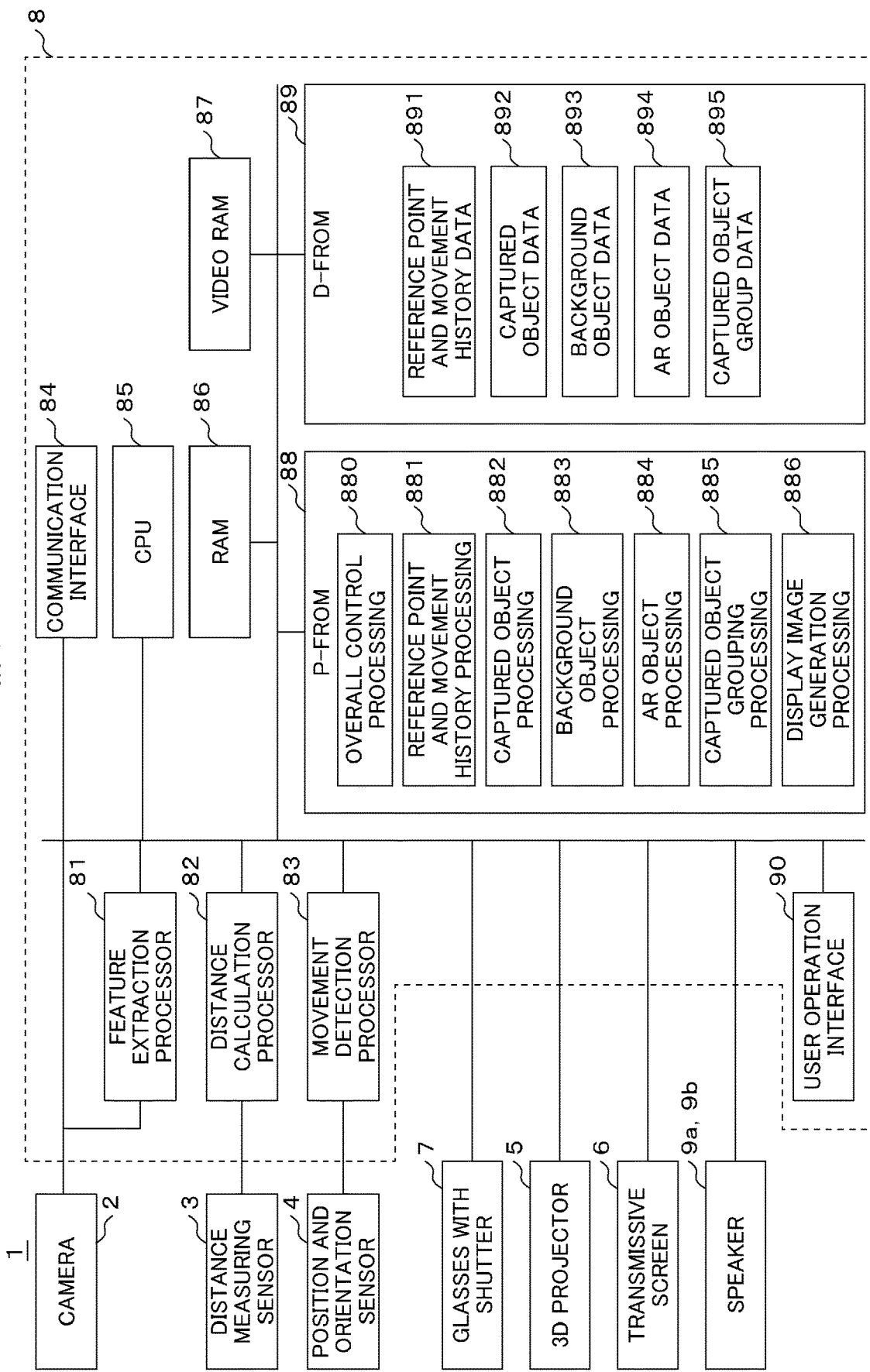
FIG. 2 is a block diagram showing the internal configuration of the AR display device.

Hereinafter, embodiments of the present invention will be described with reference to the diagrams. In addition, an augmented reality display device is also referred to as an "AR display device" for the sake of simplicity, and a person who experiences augmented reality (AR) using the augmented reality display device is referred to as a "user".

First Embodiment

FIG. 1A is a diagram showing the appearance of an augmented reality display device (AR display device) according to a first embodiment. An AR display device 1 includes a camera 2, a distance measuring sensor 3, a position and orientation sensor 4, a 3D (three-dimensional) projector 5, a transmissive screen 6, glasses with a shutter 7, a controller 8, speakers 9a and 9b, and holders 10a and 10b.

FIG. 1B is a diagram showing a state in which a user is wearing an AR display device. A user 100 wears the AR display device 1, which is an HMD, on his or her head using the holders 10a and 10b.

Each unit of the device will be described. The 3D projector (display) 5 alternately projects and displays an image of a 3D AR object, that is, an image viewed by the left eye and an image viewed by the right eye, on the transmissive screen 6. The glasses with a shutter 7 in front of the transmissive screen 6 transmit the left and right images alternately in synchronization with the switching operation of the left and right images of the 3D projector 5. As a result, the user 100 can see the landscape or the real object in front through the transmissive screen 6, and can combine and visually recognize the 3D AR object projected by the 3D projector 5 on the transmissive screen 6. The composite image that is visually recognized is also referred to as a "display image".

The camera 2 is attached so as to capture the front of the head of the user 100 (user's line-of-sight direction). The distance measuring sensor 3 measures a distance to a real object in the image captured by the camera 2. The measurement method may be a method of emitting light in a two-dimensional manner and measuring a distance from the flight time, such as a time of flight (TOF) sensor, or a method of calculating a distance from parallax information of two cameras as in Example 2 described later. The position and orientation sensor 4 detects the position and orientation of the AR display device 1, that is, the movement of the position of the user 100 or the line-of-sight direction of the user 100.

The controller 8 acquires the captured image from the camera 2, the distance data from the distance measuring sensor 3, and the position and orientation data from the position and orientation sensor 4, and supplies these to the internal memory or the CPU. In addition, the image projected by the 3D projector 5 or the sound to be output to the speakers 9a and 9b is created. In addition, a drive signal of the glasses with a shutter 7 is generated, and transmission at the left and right glasses is switched in synchronization with the left and right images of the AR object projected by the 3D projector 5, thereby providing a 3D image to the user 100.

In addition, the controller 8 includes a user interface with the user 100. When the controller 8 is realized by a device, such as a smartphone, a flat panel having a built-in touch sensor can be used as a user interface.

FIG. 2 is a block diagram showing the internal configuration of the AR display device 1. The same components as in FIGS. 1A and 1B are denoted by the same reference numerals. Inside the controller 8 (indicated by the broken line), a feature extraction processor 81, a distance calculation processor 82, a movement detection processor 83, a communication interface 84, a CPU 85, a RAM 86, a video RAM 87, a program flash ROM (P-FROM) 88, a data flash ROM (D-FROM) 89, and a user operation interface 90 are provided.

The feature extraction processor 81 extracts the contour (edge) of a real object from the captured image from the camera 2, and performs processing for setting the inflection point or the apex of the contour as a feature point. The distance calculation processor 82 calculates a distance to the feature point based on the measurement data of the distance measuring sensor 3. The movement detection processor 83 calculates the position and movement amount of the AR display device 1 and the shooting direction of the camera 2 based on the measurement data from the position and orientation sensor 4. That is, these are the position, movement amount, and line-of-sight direction of the user 100.

Various processing programs are stored in the program flash ROM 88. These include overall control processing 880, reference point and movement history processing 881, captured object processing 882, background object processing 883, AR object processing 884, captured object grouping processing 856, and display image generation processing 886. These processing programs are loaded to the RAM 86 and executed by the CPU 85. In addition, the communication interface 84 connects the AR display device 1 to an external network, so that a server or the like connected to the external network can be in charge of a part of the processing of the AR display device 1.

In addition, the data flash ROM 89 stores data generated in the process and result of executing these processing programs. That is, reference point and movement history data 891, captured object data 892, background object data 893, AR object data 894, and captured object group data 895 are included. When the user desires to reproduce and experience the AR display, the AR display can be reproduced by reading out these pieces of stored data.

In addition, the program flash ROM 88 and the data flash ROM 89 may be configured by separate memory media as shown in the diagram, or may be configured by one memory medium. In addition, these may be two or more memory media, or may be non-volatile memory media other than the flash ROM.

The image data (AR object) generated by the display image generation processing 886 is stored in the video RAM 87, read out from the video RAM 87, and projected by the 3D projector 5. In addition, the user operation interface 90 receives a user input through a touch sensor, and controls the AR display device 1 through the control screen displayed by the 3D projector 5.

In FIGS. 3A to 3D, processing until an AR object is arranged on the background image will be described through an example of a specific display image.

FIG. 3A shows an example of an image captured by the camera 2. That is, this is a real landscape that the user visually recognizes through a transmissive screen 6. The camera 2 captures the inside of the room. The inside of the room is surrounded by a left side wall 11, a right side wall 12, a front wall 13, and a floor 14 as real objects, and there are an air conditioner 15, a window 16, a table 17, two chairs 18 and 19, and the like. For the captured image of the camera, the feature extraction processor 81 extracts feature points from the contour of each object in the captured image. A set of feature points that form the contour is transmitted to the CPU 85 to identify what the object is. At this time, the object may be identified by performing comparison with the image database of the external server through the communication interface 84.

On the other hand, the distance measuring sensor 3 and the distance calculation processor 82 calculate a distance to each object in the room and create a sketch in the real space. Then, the distance data calculated by the distance calculation processor 82 is combined with the feature points extracted by the feature extraction processor 81. In addition, the position and orientation sensor 4 and the movement detection processor 83 record at which position (coordinates) and in which direction the AR display device 1 has captured the image.

The identified real object is registered separately as a "captured object" or a "background object" by the captured object processing 882 and the background object processing 883. The captured object has a unique object shape, and the distance data is relatively closely located. In this example, the air conditioner 15, the window 16, the table 17, and the chairs 18 and 19 correspond thereto. On the other hand, the background object does not have a unique object shape other than, for example, a plane, or the distance data includes the farthest point. In this example, the left side wall 11, the right side wall 12, the front wall 13, and the floor 14 correspond thereto. That is, the background object is an object that configures the background of the image captured by the camera.

In addition, for the captured object and the background object, it is determined whether the position is fixed and does not move or the position is moved and changed, and the current position is registered. In this example, the air conditioner 15, the window 16, the left side wall 11, the right side wall 12, the front wall 13, and the floor 14 are objects whose positions are fixed. On the other hand, the table 17, the chairs 18 and 19, and the like are movable objects whose positions change due to changes in layout (pattern) and the like. For the movable object, position data after the movement is acquired, and the AR object is arranged according to the position after the movement.

FIG. 3B is an example of a display image in which a background image and an AR object are combined. In addition to the real objects 11 to 19 in the room, AR objects 20 to 23 are added, so that the user can visually recognize such a display image by using the AR display device 1.

As an AR object, the curtain object 20 is arranged in the window 16. In addition, the clock object 21 is arranged on the right side wall 12, the vase object 22 is arranged on the table 17, and the stuffed animal object 23 is arranged on the chair 18.

The arrangement of such AR objects is determined by the AR object processing 884 based on the user's operation. This operation and process are referred to as "association operation" and "association process", respectively. That is, in the association process, the coordinates for arranging each AR object are determined based on the sketch of the real space created from the camera image of FIG. 3A and considering the current position of the AR display device 1. At this time, in the AR object arrangement information (association information), not only to specify which object to associate with but also to specify in which part of the object to arrange, an offset distance is given to a specific feature point of the object for positioning.

For example, it is specified to which position of the window 16 the curtain object 20 is to be attached and at which position of the table 17 the vase object 22 is to be placed. In addition, when the stuffed animal object 23 is arranged on the chair 18, the posture of the stuffed animal object 23 is aligned with the direction of the chair 18. In addition to being arranged in contact with an object, the above object may be suspended in space. The status of these associations (association information) is expressed by numerical parameters and stored in the data flash ROM 89 together with the position information of the AR object.

As a feature of the present embodiment, an AR object (the vase object 22 or the stuffed animal object 23) arranged on a movable object, such as the table 17 or the chair 18, is arranged while maintaining the positional relationship with the movable object when the movable object moves. When the movable object rotates, the AR object also rotates by the same angle and is arranged so as to maintain the same posture with respect to the movable object. When the front-and-back relationship with the AR object changes due to the movement of the object, a hidden AR object part is masked so as not to be viewable in the arrangement after the movement. By these display control processes, the display is performed so as not to give a sense of discomfort to the user.

Next, the characteristic display control in the present embodiment will be described.

Figure 3C:
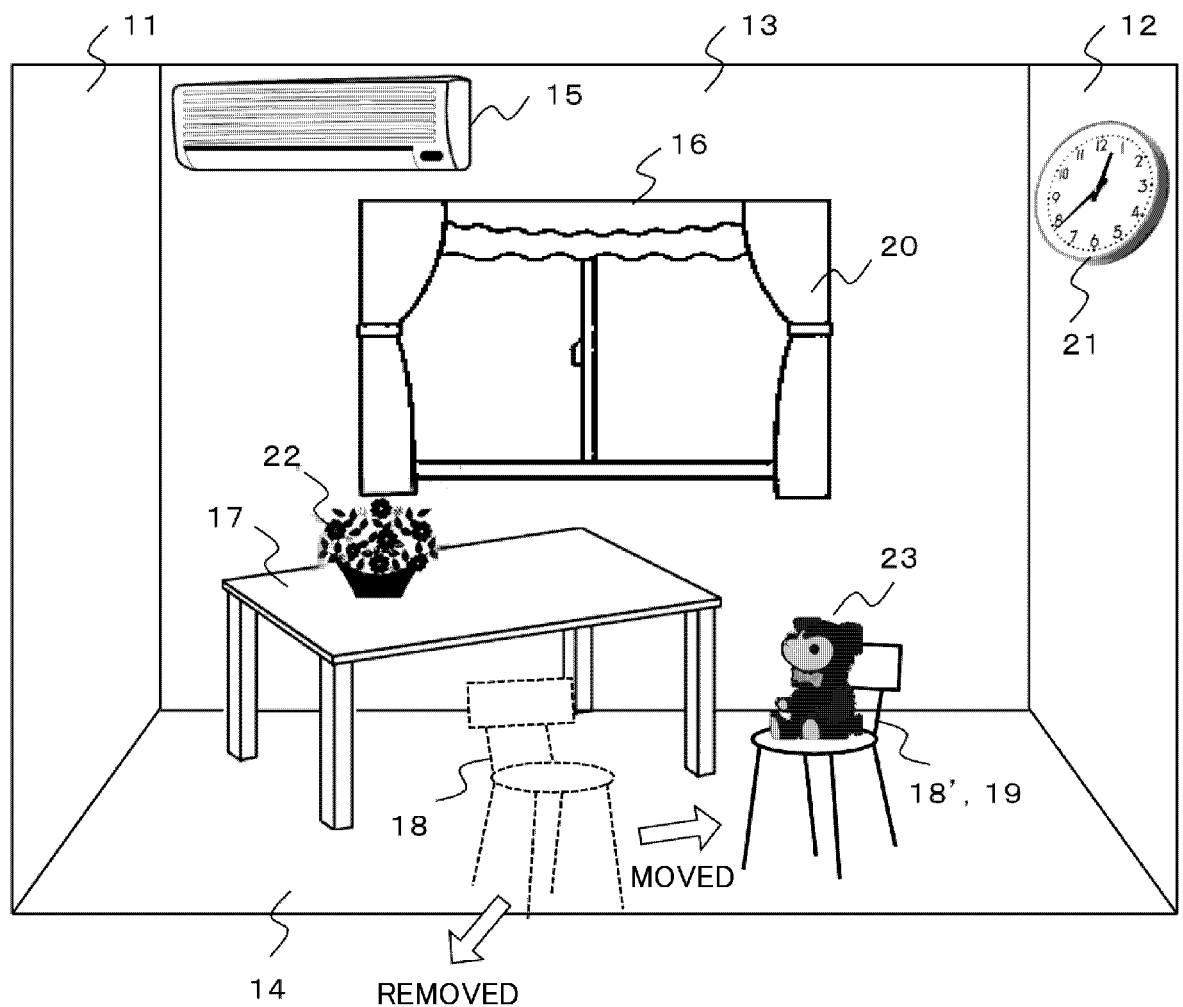
FIG. 3C is a diagram showing an example of a display image when a movable object moves.

FIG. 3C shows a display when the chair 18, which is a movable object, is moved by, for example, a human hand after the display image of FIG. 3B. The stuffed animal object 23, which is an AR object, is arranged on a chair 18' after the movement. At this time, since it is detected that the chair 18' has moved, the stuffed animal object 23 associated with the chair 18' moves while maintaining the positional relationship with the chair 18'. In addition, when the chair 18' is rotated, the stuffed animal object 23 is also rotated in the same manner, and as a result, the stuffed animal object 23 is arranged while maintaining the posture with respect to the chair 18'. When the chair 18 is moved out of the range of the image captured by the camera, the stuffed animal object 23 associated with the chair 18 is also excluded from the display image.

In addition, in FIG. 3C, one of the two chairs 18 and 19 in FIG. 3B has been removed. When the chair 18 is removed and the remaining chair has reference numeral 19, the stuffed animal object 23 is arranged on the remaining chair 19. This is due to the effect of grouping the captured objects, which will be described later.

FIG. 3D shows a display when a partition 25 is additionally arranged in the real space after the display image of FIG. 3C. In this example, the partition 25 is arranged in front of the table 17, and is arranged close to the vase object 22, which is an AR object, so as to partially overlap the vase object 22. In the display in this case, since the vase object 22 is present on the table 17, a portion overlapping the partition 25 is shaded by the partition 25 and is displayed invisible to the user (indicated by the dotted line). Therefore, the following processing is performed.

The partition 25 is recognized as a captured object, and distance data is given to its feature points. The distance data of the partition 25 is compared with the distance data of the vase object 22 that is an AR object being displayed. As a result of comparing the distance of the vase object 22 with the distance of the partition 25 close to the vase object 22, the vase object 22 is located behind the partition 25, and accordingly, the hidden portion of the vase object 22 is not displayed.

In the case of FIG. 3D, the curtain object 20 that is an AR object also overlaps the partition 25, so that the lower left portion is not displayed. Thus, when the AR object to be displayed overlaps the captured object in the line-of-sight direction and the AR object is arranged behind the captured object, the hidden portion of the AR object is not displayed so that the display is performed without discomfort.

Figure 4:
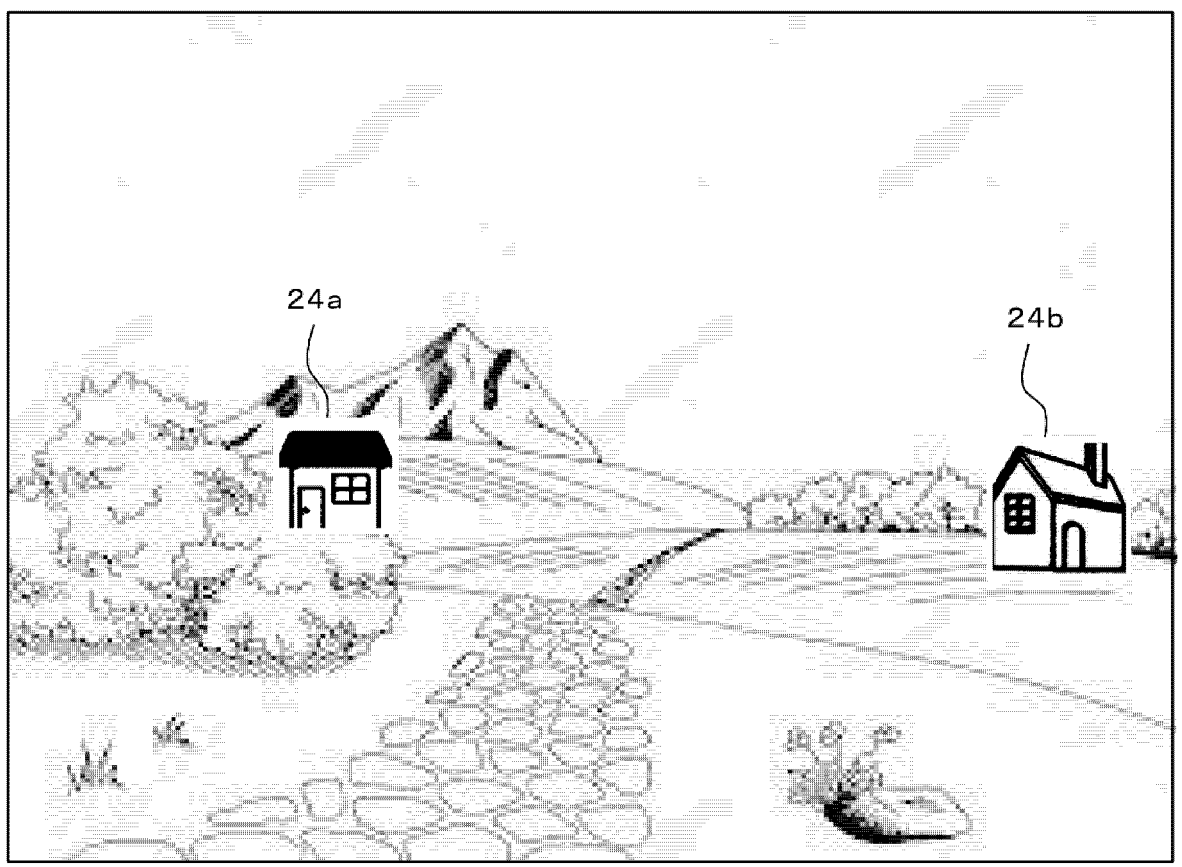
FIG. 4 is a diagram showing an example of a display image in which an AR object is arranged in a natural landscape.

FIG. 4 is a diagram showing an example of a display image in which an AR object is arranged in a natural landscape. In this example, the camera captures a natural landscape. Objects (natural objects, such as mountains, forests, and hills) in the landscape are at distances that cannot be measured by the distance measuring sensor 3, and such objects are treated as "background objects". Distance data large enough (or at infinity) is given to the background objects.

AR objects can also be arranged on the background object, such as a landscape. In this example, two house objects 24a and 24b are displayed so as to be associated with the background object. At this time, by giving distance data to the house objects 24a and 24b and arranging these in a predetermined positional relationship with respect to the background object (mountain, forest, and the like), it is possible to display a good-looking landscape.

Figure 5A:
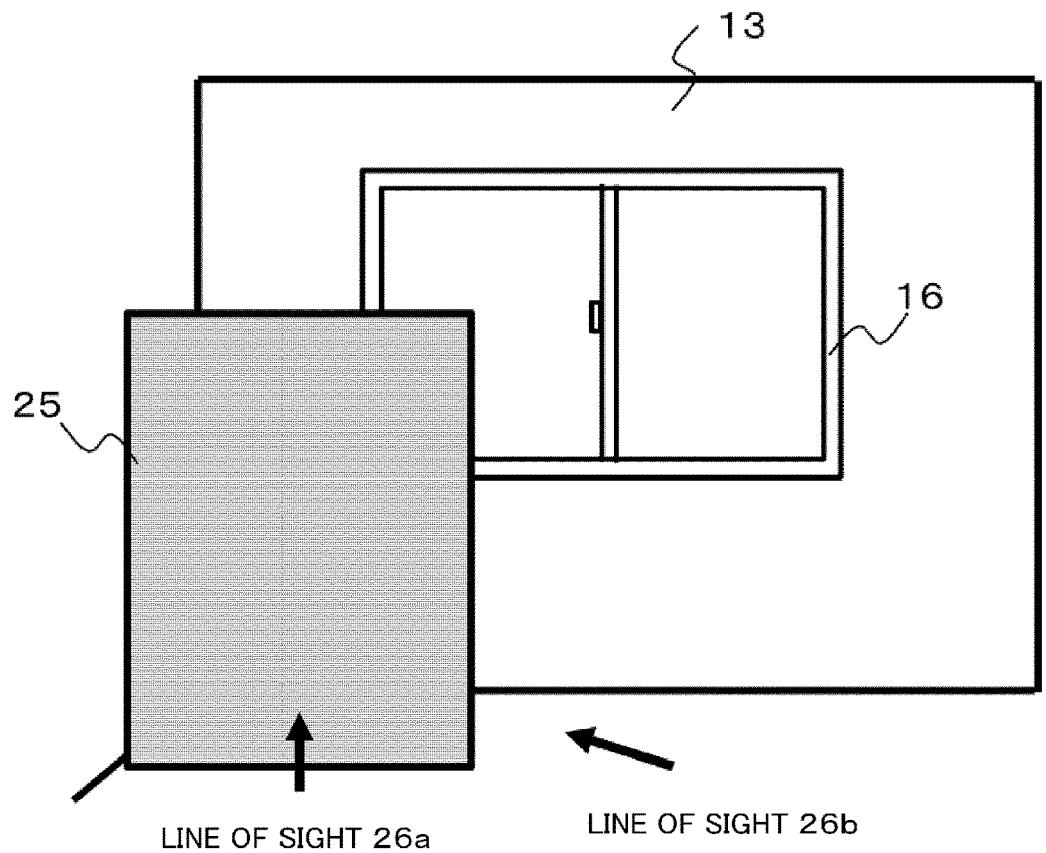
FIG. 5A is a diagram for describing the user's line-of-sight direction and how to recognize a background object.
Figure 5B:
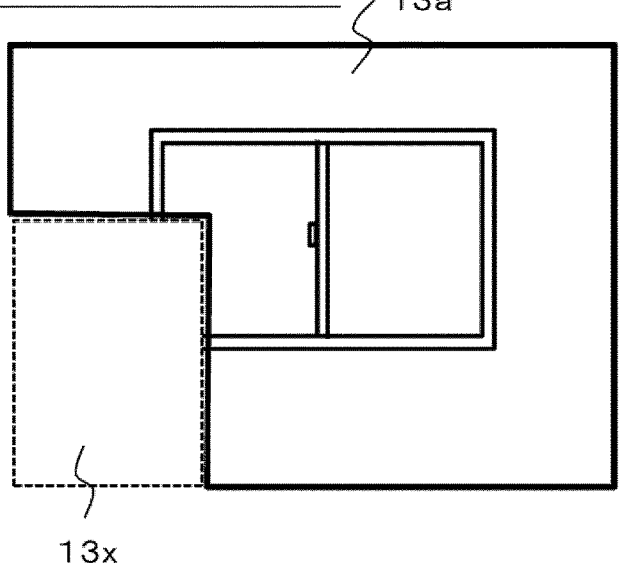
Figure 5C:
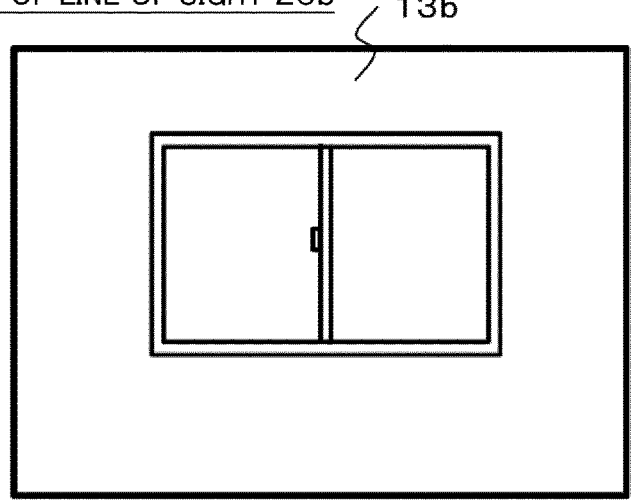
FIG. 5C is a diagram showing a method of recognition when the user's line-of-sight direction is a direction of reference numeral 26b.

FIGS. 5A to 5C are diagrams for explaining the user's line-of-sight direction and how to recognize the background object.

In FIG. 5A, the front wall 13 and the window 16 are present in the image captured by the camera, and the partition 25 is arranged in front. The front wall 13 and the partition 25 are real objects, and are recognized as a background object and a captured object, respectively. On the other hand, a case is assumed in which the user's line-of-sight direction moves from the direction of reference numeral 26a to the direction of reference numeral 26b.

FIG. 5B is a diagram showing a recognizable region of the front wall 13 when the user's line-of-sight direction is the direction of reference numeral 26a. Since a part of the front wall 13 is covered with the partition 25, a region 13a can be recognized as a background object, and a region 13x in the lower left corner is missing.

FIG. 5C is a diagram showing a recognizable region of the front wall 13 when the user's line-of-sight direction moves in the direction of reference numeral 26b. The user can see the entire front wall 13 behind the partition 25. As a result, a rectangular region 13b can be recognized as a background object. Thus, the region (shape) of the background object on the back surface of the captured object may change depending on the user's line-of-sight direction (direction of the AR display device).

Once the background object is recognized as a background object having a wide area, the background object is treated as a background object having a wide area regardless of the subsequent line-of-sight direction. This makes it possible to arrange the AR object in the portion 13x of the front wall, which is behind the partition 25 and should not be visible in the line-of-sight direction 26a.

Figure 6:
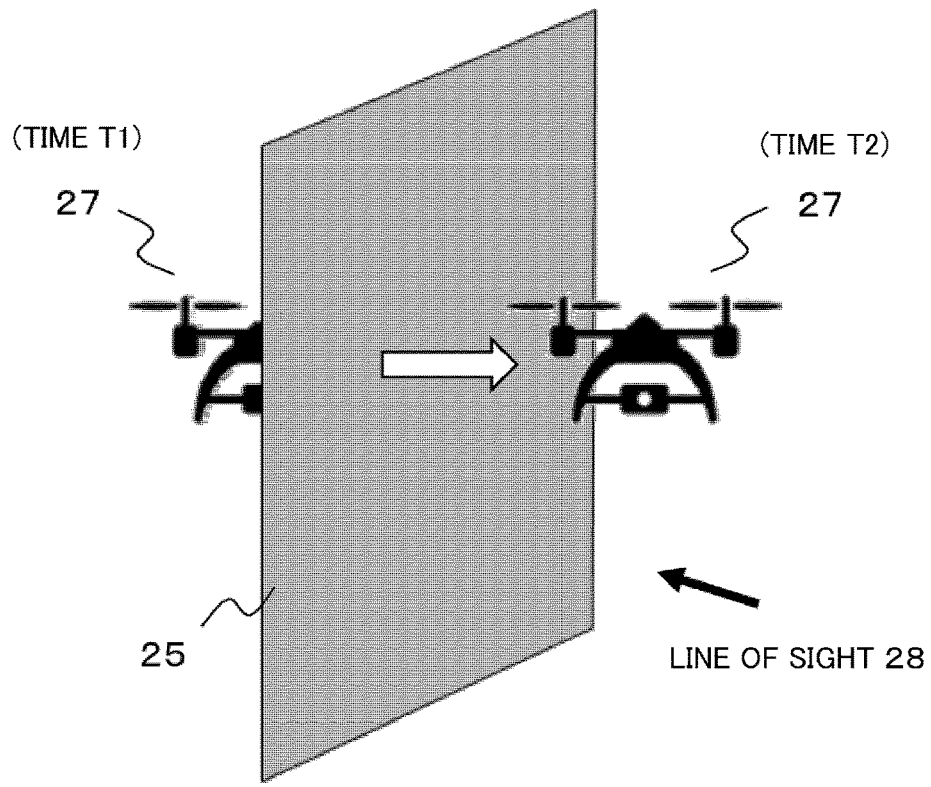
FIG. 6 is a diagram showing a display example of a movable AR object.

FIG. 6 is a diagram showing a display example of a movable AR object. A drone object 27 is associated with the vicinity of the partition 25, but is a movable AR object. A predetermined movement profile is given to the drone object 27. For example, the drone object 27 is located on the left side of the partition 25 as a starting point at time T1, moves according to the parameters of the moving speed and the moving direction, and is located on the right side of the partition 25 at time T2. When the user's line-of-sight direction 28 is on the right side of the partition 25, the drone object 27 appears to have appeared through the partition 25. In this manner, by using a movable AR object, it is possible to experience AR in which a moving object suddenly appears from an obstacle.

FIG. 7 is a diagram showing a display example of an AR object linked to the line of sight. The stuffed animal object 23 is a 3D image, and is associated so as to turn its body toward a direction in which the stuffed animal object 23 is sitting on the chair. Therefore, when the chair 18 moves to the position of the chair 19, the user's line of sight changes from the direction of reference numeral 29a to the direction of reference numeral 29b and the 3D display of the stuffed animal object 23 is also rotated, so that it is possible to perform display according to the direction in which the stuffed animal object 23 is sitting on the chair.

Next, various processing flows performed by the AR display device 1 will be described. That is, the CPU 85 executes a process according to the following program stored in the program flash ROM 88.

Figure 8:
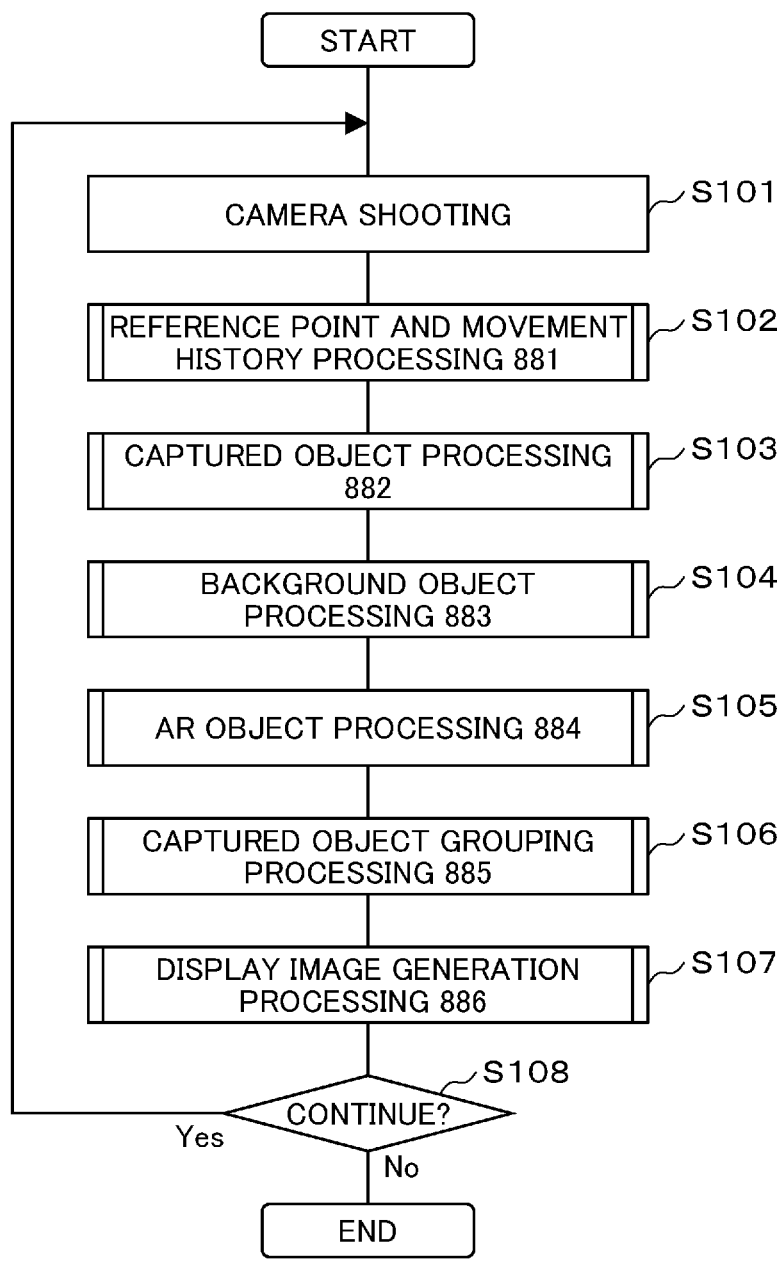
FIG. 8 is a diagram showing a flow of overall control processing 880.

FIG. 8 is a flow of the overall control processing 880. That is, the entire process from camera shooting to displaying the AR object is shown.

Camera shooting starts in S101. The camera shooting may be performed at a timing when the entire AR processing is performed, or may be performed so as to capture an image that is to be captured at a timing when the entire AR processing is performed in a state in which moving image capturing continues at 30 frames/second, for example.

S102 is the reference point and movement history processing 881. The position and shooting direction of the camera, that is, the position of the user's head and the line-of-sight direction, are detected at each time and registered in the reference point and movement history data 891.

S103 is the captured object processing 882. The features of the image captured by the camera are extracted to select feature points, it is recognized which is a real object for the set of feature points, and this is registered in the captured object data 892 as a captured object.

S104 is the background object processing 883. A region including a feature point, for which distance data given to a feature point is the farthest point, and excluding a captured object is registered in the background object data 893 as a background object.

S105 is the AR object processing 884. An AR object to be arranged on the captured object and the background object is selected, and a parameter (display parameter) when arranging the AR object is determined. This process includes a selection operation by the user. The data of the selected AR object is registered in the AR object data 894, and the display parameter is registered in the captured object data 892 and the background object data 893 as associated data.

S106 is the captured object grouping processing 885. A plurality of related captured objects to be associated with a common AR object are grouped and registered in the captured object group data 895.

S107 is the display image generation processing 886. Various kinds of registered data are read out, a display image of the AR object is processed and generated, and the display image is written in the video RAM 87 and projected on the transmissive screen 6 by the 3D projector 5. At this time, a drive signal for the glasses with a shutter 7 is also generated.

It is determined in S108 whether or not to continue. If continuation is determined (Yes), the process returns to S101. If non-continuation is determined (No), the process ends.

Hereinafter, each of the processes 881 to 886 will be described in detail.

Figure 9:
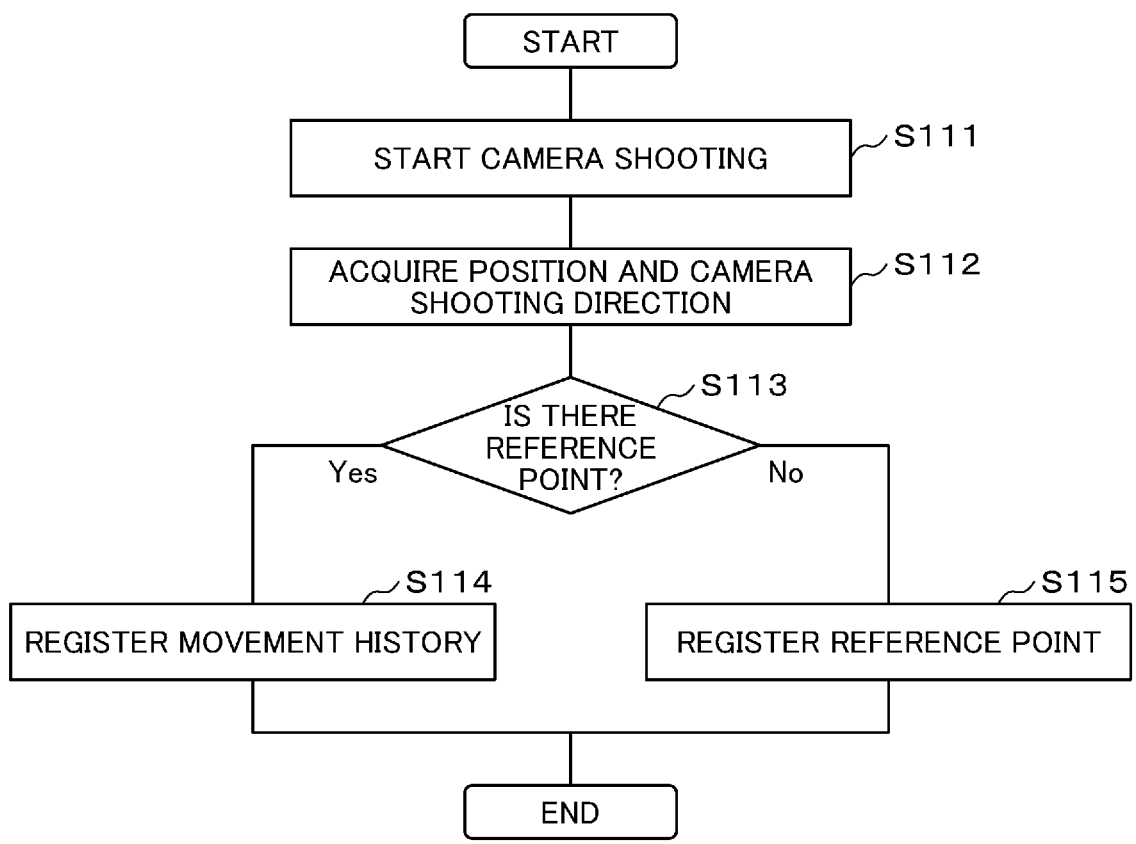
FIG. 9 is a diagram showing a flow of reference point and movement history processing 881.

FIG. 9 is a flow of the reference point and movement history processing 881. This process is performed by the position and orientation sensor 4 and the movement detection processor 83.

In S111, the user wears the AR display device 1, stands almost at the center of the real space to experience AR, and starts camera shooting. The position of the starting point and the camera shooting direction are paired to serve as a reference point in the real space.

In S112, the position and orientation sensor 4 detects the position of the AR display device 1 and the shooting direction of the camera 2, and acquires these as data indicating the user's position and the line-of-sight direction.

In S113, it is checked whether or not the reference point data is already registered in the reference point and movement history data 891 in the data flash ROM 89, that is, whether or not to start the AR experience. When the reference point data is not registered (No), registration as reference point data is performed in S115. When the reference point data is registered (Yes), registration as movement history data is performed in S114. The movement history data is indicated by the difference from the reference point data.

Thereafter, each time the user performs camera shooting while moving in the real space, the pair of the current position and the camera shooting direction is recorded in the reference point and movement history data 891 as a movement history.

Figure 10:
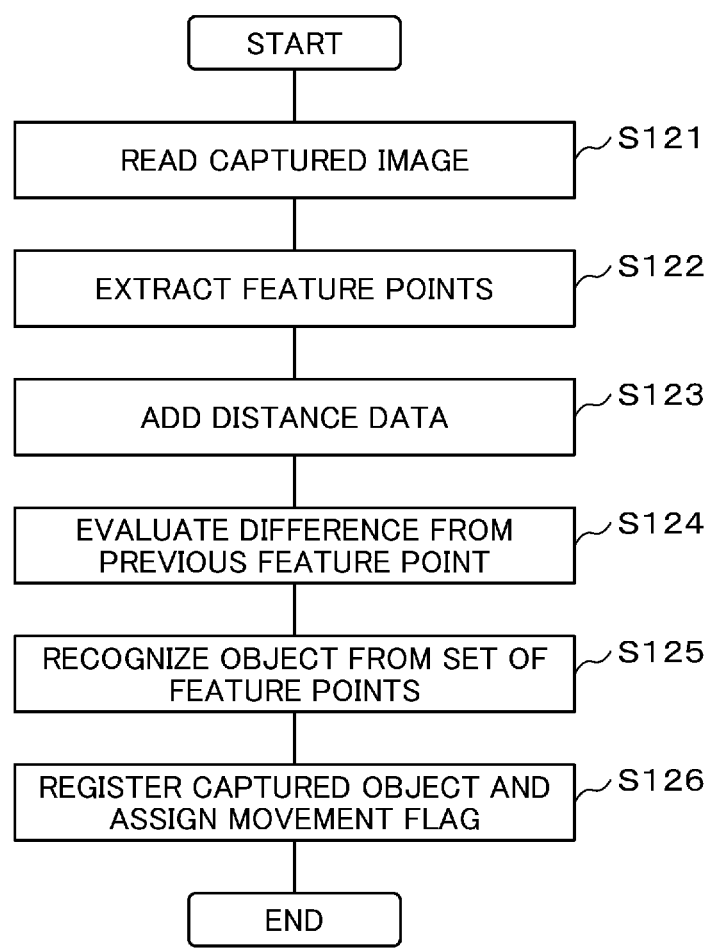
FIG. 10 is a diagram showing a flow of captured object processing 882.

FIG. 10 is a flow of the captured object processing 882. This process is performed by the feature extraction processor 81.

In S121, a captured image is read out from the camera 2.

In S122, image feature analysis is performed to extract an edge and extract the apex of the edge or the inflection point as a feature point, for example.

In S123, the distance data acquired by the distance measuring sensor 3 and the distance calculation processor 82 is added to the feature point.

In S124, the difference from the previous feature point is evaluated, and in S125, the type of the object and the like are recognized from the set of feature points evaluated to have significant differences from the previous feature point. At this time, the object may be identified by performing comparison with the image database of the external server through the communication interface 84.

In S126, the identification result is registered in the captured object data 892 as a captured object. In addition, a "movement flag" is assigned to indicate whether or not the position of the captured object acquired by the distance measuring sensor 3 has moved from the previous position. The value "X" of the movement flag means a reference point, "0" means that there is no movement, and "1" means that there is movement.

Figure 11:
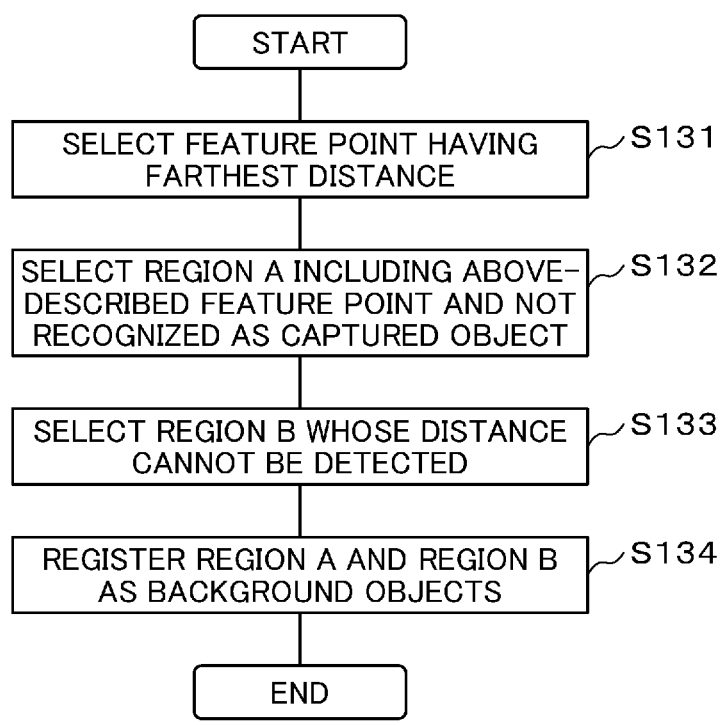
FIG. 11 is a diagram showing a flow of background object processing 883.

FIG. 11 is a flow of the background object processing 883.

In S131, a feature point having the farthest distance is selected from the feature points extracted by the feature extraction processor 81. In the example of FIG. 3A, the corner of the front wall 13 corresponds thereto.

In S132, a region including a feature point having the farthest distance and not recognized as a captured object is selected (referred to as a region A).

In S133, among the feature points extracted by the feature extraction processor 81, a region whose distance cannot be detected (exceeding the detection limit) is selected (referred to as a region B).

In S134, the above region A and region B are regarded as elements configuring the background in the real space, and are registered in the background object data 893 as a background object.

In addition, when the feature point having the farthest distance is included in the captured object in S132, the farthest point is shared by the background object and the captured object.

Figure 12A:
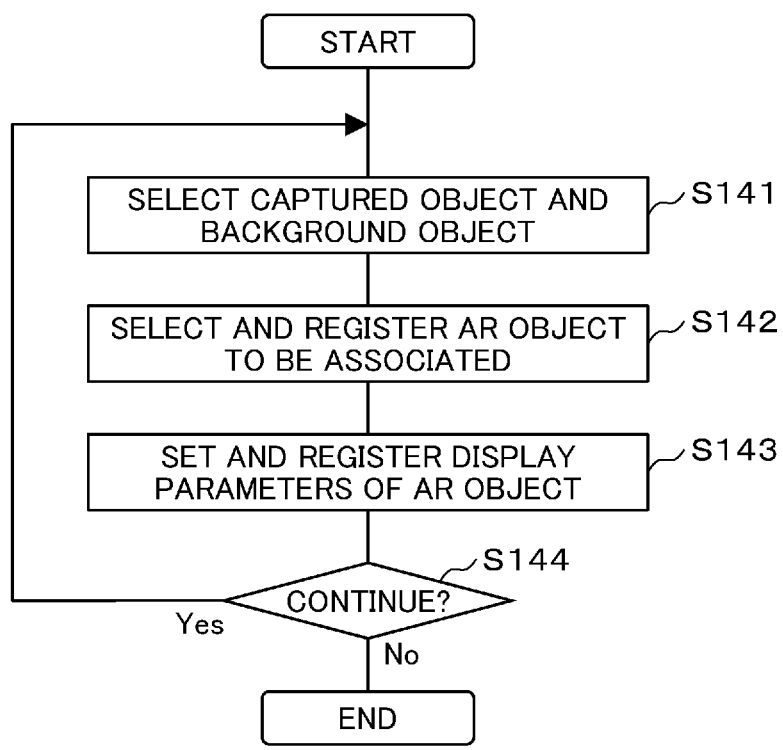
FIG. 12A is a diagram showing a flow of AR object processing 884 (first case).
Figure 12B:
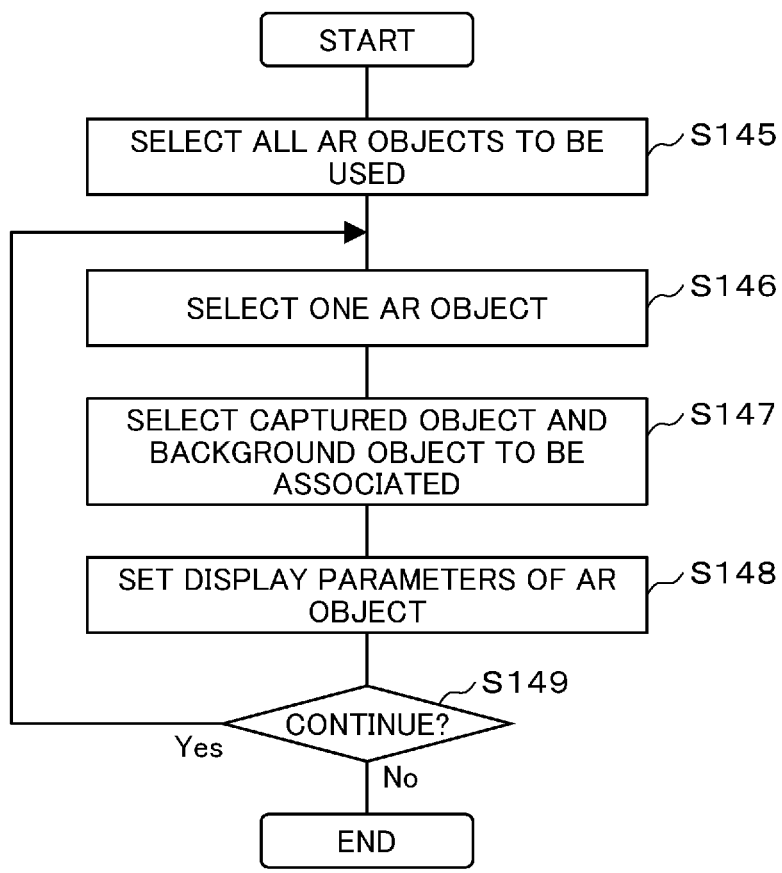
FIG. 12B is a diagram showing a flow of the AR object processing 884 (second case).

FIGS. 12A and 12B are flows of the AR object processing 884. In FIGS. 12A and 12B, some of the processing procedures are replaced with each other. This process is performed interactively by the user while looking at the operation screen.

The case of FIG. 12A will be described.

In S141, one object on which an AR object is to be arranged is selected from the captured object or the background object.

In S142, an AR object to be associated with the selected object is selected. An AR object selection candidate may be prepared in advance on the AR display device 1, or data stored in the external server may be referred to through the communication interface 84. The selected AR object is registered in the AR object data 894.

In S143, display parameters when displaying an AR object are set. As a result, the display position, size, and direction of the AR object with respect to an object are given. That is, positioning with respect to the object can be performed by giving an offset to the position of a certain feature point of the selected object. In a background object whose feature points are not clear, such as the region B, an arbitrary point in the region may be selected and the selected point may be used as a pseudo feature point. For example, positioning can be performed by indicating one point of a flat portion of the wall with coordinates from the corner of the wall, a pillar, or the ceiling. The set display parameters are registered in the captured object data 892 and the background object data 893 as associated data of the AR object.

In S144, it is determined whether or not a captured object or a background object on which the AR object is to be arranged remains. If the captured object or the background object remains (Yes), the process returns to S141. If the captured object or the background object does not remain (No), the process ends.

Next, the case of FIG. 12B will be described. In this case, the procedure is to select an AR object first and then assign a captured object or a background object to the selected AR object.

In S145, all AR objects to be used are selected. Therefore, AR objects built in the AR display device 1 or an external server is referred to. The selected AR object is registered in the AR object data 894.

In S146, one of the selected AR objects is selected.

In S147, a captured object or a background object with which the selected AR object is to be associated is selected.

In S148, display parameters (position, size, and direction on the display) when displaying the AR object are set. The set display parameters are registered in the captured object data 892 and the background object data 893 as associated data of the AR object.

In S149, it is determined whether or not the AR object selected in S145 remains. If the AR object selected in S145 remains (Yes), the process returns to S146. If the AR object selected in S145 does not remain (No), the process ends.

When FIGS. 12A and 12B are compared with each other, the flow of FIG. 12A is efficient when the number of captured objects or background objects to be associated is smaller than the number of AR object choices. On the contrary, when the number of AR objects to be associated is smaller than the number of choices of the captured object or the background object, the flow of FIG. 12B is efficient. The user can select either the flow of FIG. 12A or the flow of FIG. 12B depending on the situation at that time.

In addition, an example of the user's operation screen in the AR object processing 884 will be described with reference to FIGS. 15A and 15B.

Figure 13:
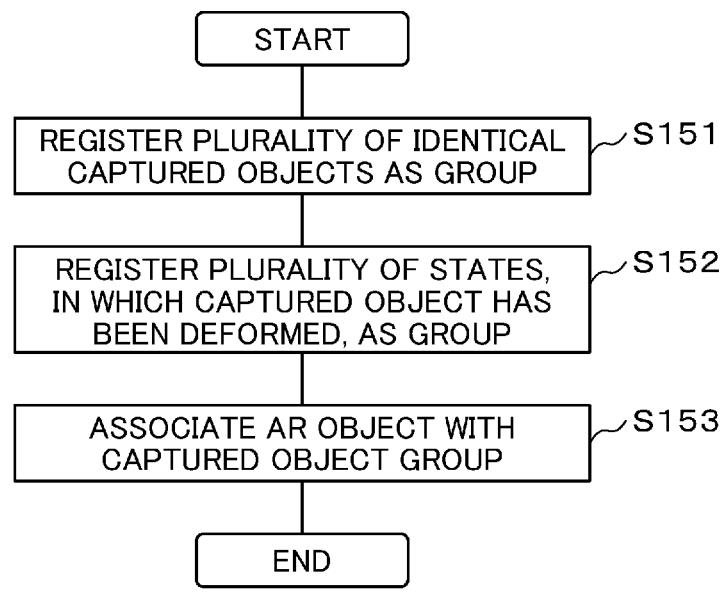
FIG. 13 is a diagram showing a flow of captured object grouping processing 885.

FIG. 13 is a flow of the captured object grouping processing 885. The captured object grouping is a process of grouping a plurality of captured objects and associating a common AR object therewith.

In S151, a plurality of captured objects having the same form are registered in the captured object group data 895 as a captured object group. For example, the two chairs 18 and 19 in FIG. 3A are grouped. At this time, the priority of association with each captured object is specified.

In S152, a plurality of states in which one captured object is deformed are registered as a captured object group. For example, the window 16 in FIG. 3A can be deformed in a closed state, an open state, a state in which the curtain is drawn, and the like, and these are grouped.

In S153, a common AR object is associated with the registered captured object group, and the display parameters are set.

By this grouping process, it is possible to reflect the intention of the user who has performed the association and display the AR object flexibly according to the situation in the real space.

Figure 14:
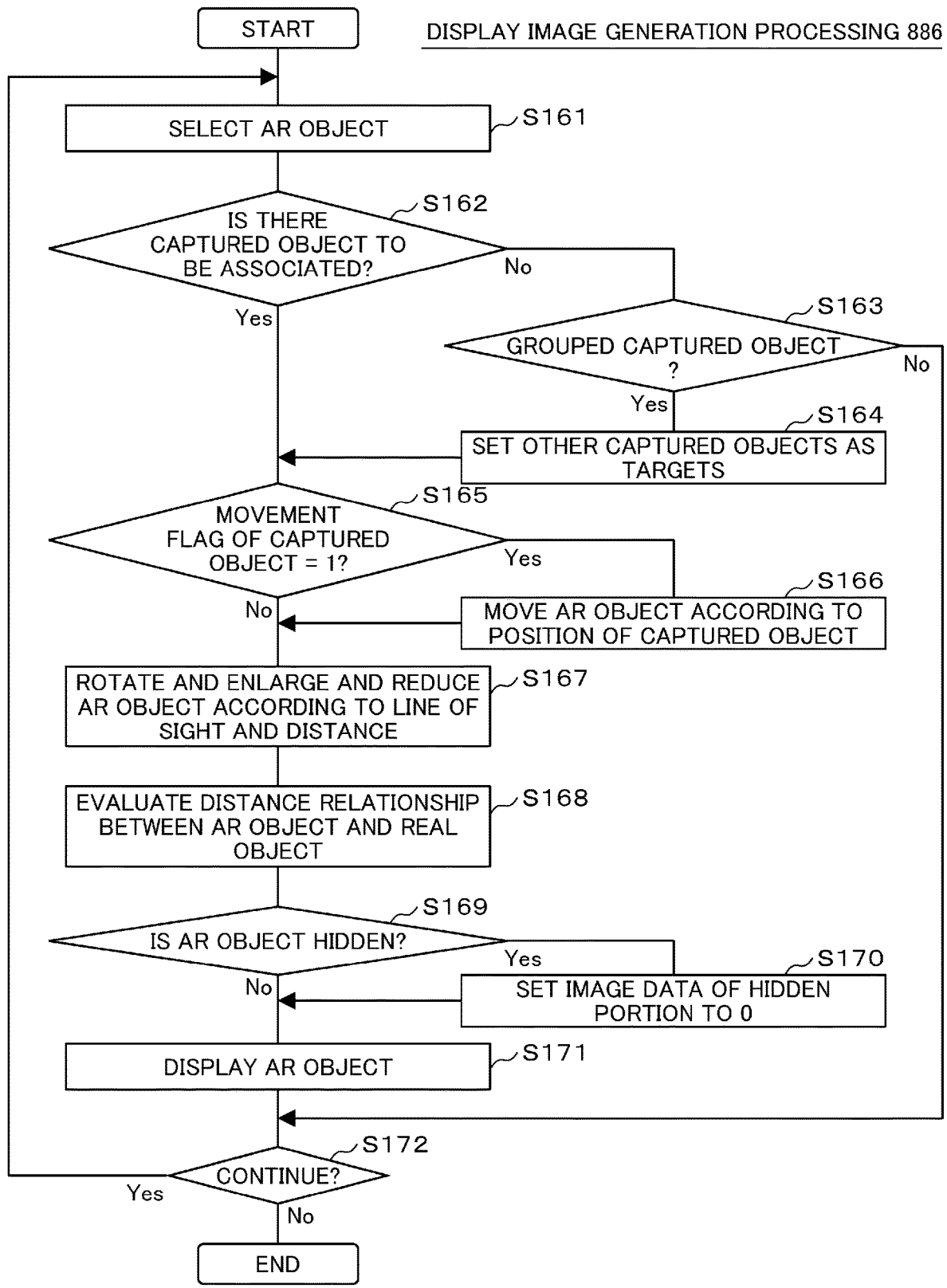
FIG. 14 is a diagram showing a flow of display image generation processing 886.

FIG. 14 is a flow of the display image generation processing 886. Here, various kinds of data registered in the data flash ROM 89 are read out to generate a display image of the AR object, and the display image is projected and displayed by the 3D projector 5.

In S161, an AR object to be displayed is selected by referring to the captured object data 892, the background object data 893, and the AR object data 894.

In S162, it is determined whether or not a captured object to be associated with the selected AR object is present in the current shooting space. If the captured object is present (Yes), the process proceeds to S165. If the captured object is not present (No), the process proceeds to S163.

In S163, it is determined whether or not captured objects to be associated are grouped with reference to the captured object group data 895. If the captured objects to be associated are grouped (Yes), the process proceeds to S164. If the captured objects to be associated are not grouped (No), the process proceeds to S172.

In S164, other captured objects that have been grouped are set as targets to be associated. At this time, if there are a plurality of candidates, the target is determined according to the priority. For example, as shown in FIG. 3C, the object to be associated is switched from the chair 18 to the chair 19.

In S165, the movement flag of the target captured object is referred to, and it is determined whether or not the movement flag of the target captured object is "1" (=movable). If the movement flag is "1" (Yes), the process proceeds to S166. If the movement flag is not "1" ("0" of non-movable or "X" of reference point), the process proceeds to S167.

In S166, the AR object is moved and positioned according to the current position of the captured object. In addition, if the movement flag is "0" (non-movable), the previous position is applied.

In S167, the AR object is rotated according to the direction of the AR display device 1 (the line of sight of the user). In addition, the AR object is enlarged or reduced according to the distance to the captured object (or the background object) to be associated. As a result, the displays shown in FIGS. 5A to 5C and 7 become possible.

In S168, the distance relationship between the AR object and the real object (captured object) overlapping the AR object in the line-of-sight direction is evaluated.

In S169, it is determined whether or not the AR object is hidden by the real object, that is, whether or not the real object is present in front of the AR object. If the AR object is hidden (Yes), the process proceeds to S170. If the AR object is not hidden (No), the process proceeds to S171.

In S170, the image of the hidden portion of the AR object is masked (for example, the image data is rewritten to 0). This enables the display shown in FIG. 3D.

In S171, the 3D projector 5 projects and displays the AR object.

In S172, if there is an unprocessed AR object (Yes), the process returns to S161 to process the next AR object.

Figure 15A:
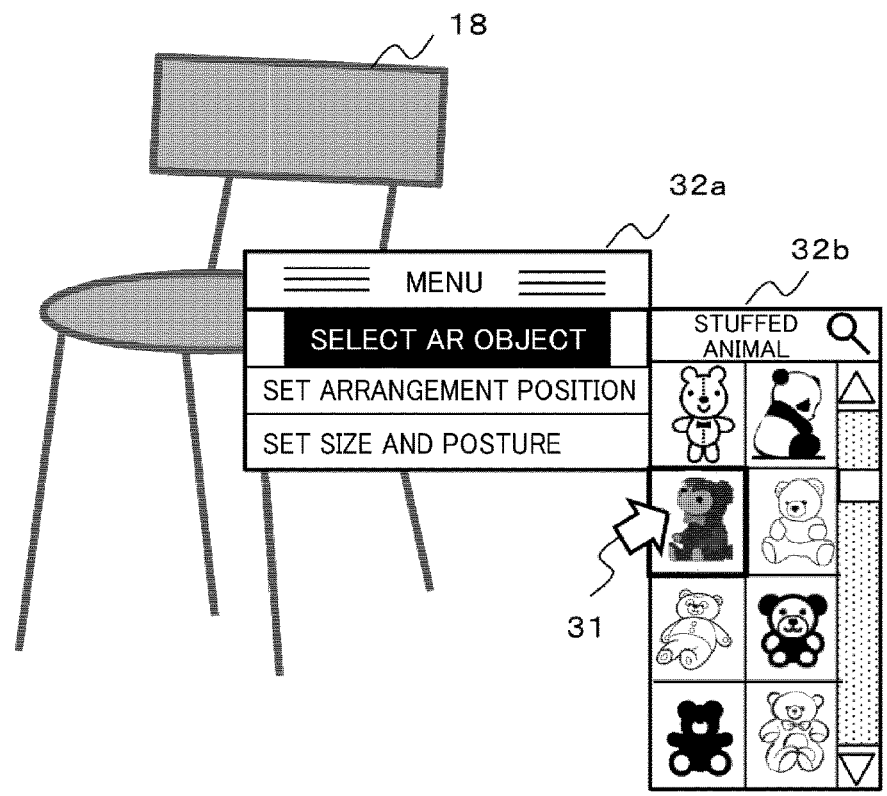
FIG. 15A is a diagram showing a specific example of a user operation in the AR object processing 884.
Figure 15B:
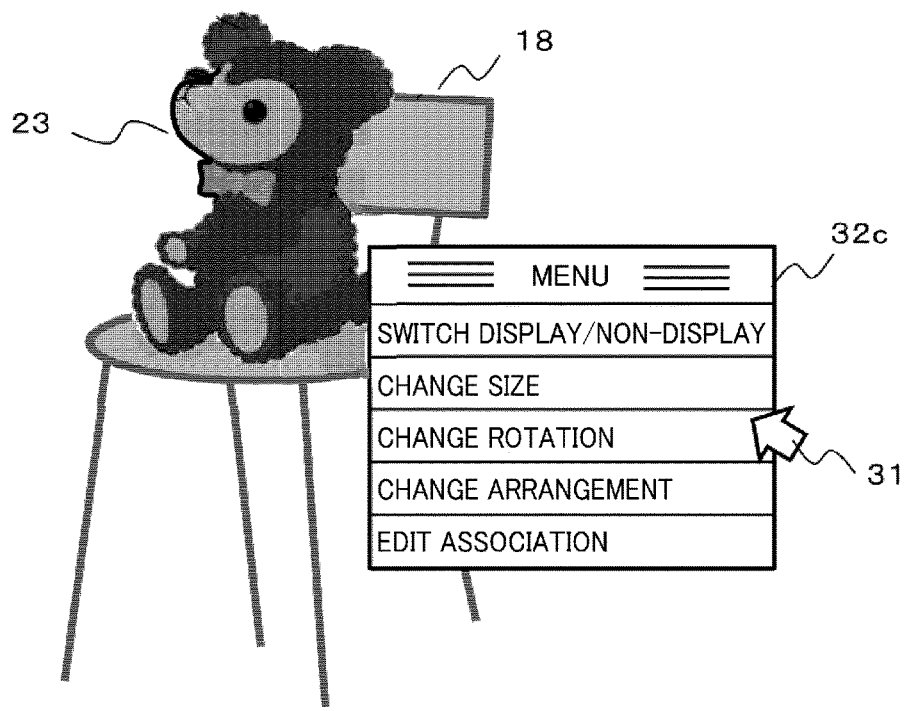
FIG. 15B is a diagram showing a specific example of a user operation in the AR object processing 884.

FIGS. 15A and 15B are diagrams showing specific examples of the user operation in the AR object processing 884 described with reference to FIG. 12A (FIG. 12B). This is a scene in which the chair 18, which is a real object, is recognized as a captured object and the stuffed animal object 23, which is an AR object, is associated with the captured object. In addition, this process is performed interactively by the user while looking at the operation screen.

FIG. 15A is a screen for selecting an AR object to be associated. In this association operation, first, a cursor 31 is placed on the chair 18 and clicked. By this operation, a menu small screen 32a pops up. In the list presented on the menu small screen 32a, "Select AR object" is clicked. The clicked item is converted to outline characters on a black background. In response to this, an AR object candidate screen 32b appears, and a desired AR object is selected with the cursor 31. In addition, an item of "Arrangement position setting" or "Size and posture setting" at the bottom of the menu is clicked to set detailed display parameters of the selected AR object.

FIG. 15B is a scene in which the display parameters of the AR object 23 once set are changed. Here, a menu small screen 32c is displayed. The menu list includes display/non-display switching, display size change, display rotation change, and arrangement change (offset change), and desired items can be changed.

FIGS. 16 to 21 are diagrams showing examples of various data tables stored in the data flash ROM 89.

FIG. 16 is header data, and a list of data handled by the AR display device 1 is described in "Accompanying Content". In addition, at the top of the table, there is a "content ID" indicating data relevant to the AR experience. This "content ID" is an ID common to tables of a captured object, a background object, an AR object, and the like, which will be described later. In addition, information, such as "content owner" or "copyright", is included.

FIG. 17 shows the reference point and movement history data 891. There is a common "content ID", and the "content type" indicates reference point and movement history data. As the data, time (T0, T1, T2), position, and direction are described for "reference point (PBase)" and "movement history (MP1, MP2)". The time is the camera shooting time of AR processing, and is described in Coordinated Universal Time (UTC=Universal Time, Coordinated). As for the position and the direction, the position and shooting direction of the AR display device 1 at each time are indicated by difference data with the reference point (PBase) as a starting point. For example, the movement history (MP1) at time T1 is indicated by the difference position (r1, θ1, ϕ1)=(distance, horizontal angle, vertical angle) and the difference direction (θθ1, ϕϕ1)=(horizontal angle, vertical angle).

In addition, in this example, position=(0,0,0) and direction=(0,0) are given as values of the reference point. However, the value of GPS data may be given for the position, and the value of the azimuth may be given for the direction.

FIGS. 18A to 18C show the captured object data 892. The captured object data is described separately for each shooting position, FIG. 18A is data at the reference position (PBase), FIG. 18B is data at the movement position (MP1), and FIG. 18C is data at the movement position (MP2). In addition, the pieces of data in FIGS. 18A to 18C correspond to the scenes in FIGS. 3B to 3D, respectively.

The captured objects recognized at the respective shooting positions are numbered such as "captured object 1", "captured object 2", . . . , and "table", "chair 1", . . . that are recognized object names are described. For each captured object, the extracted "feature point 1", "feature point 2", . . . , and the data of "associated AR object" are described. In addition, a "movement flag" indicating whether or not the captured object is a movable object is assigned to each captured object. At the reference point, the movement flag="X", the immovable object is displayed as "0", and the movable object is displayed as "1".

The data of each feature point includes a position (distance and direction) relative to the shooting position of the AR display device 1. The data of "associated AR object" is linked to the AR object data 894, which will be described later, and the AR object (title) specified by the data ID is associated. In addition, "associated position" indicates an offset distance and a feature point at which the AR object is to be arranged, and "size" and "rotation" are parameters when displaying the AR object.

In this example, when the shooting position is the reference position (PBase) (FIG. 18A), captured objects 1 to 3 are described, an associated AR object 1 is associated with the captured object 1 (table), and an associated AR object 2 is associated with the captured object 2 (chair 1). In addition, when the shooting position is the movement position (MP2) (FIG. 18C), a captured object 4 (partition) is newly recognized and added.

The numerical values of the positions or directions of the captured objects 1 and 2 with respect to each feature point are slightly different between the reference position (PBase) and the movement position (MP1 and MP2). This is because, even if the captured objects 1 and 2 do not move in the real space, the values differ depending on the movement of the AR display device 1. In such a case, the difference in numerical values is recognized as being associated with the movement of the AR display device 1, and whether or not the actual object has moved is determined based on the movement of the AR display device 1.

On the other hand, at the movement position (MP1) in FIG. 18B, the captured object 2 (chair 1) is moving in the real space, and the "movement flag" is set to "1" indicating a movable object. In addition, at the movement position (MP2) in FIG. 18C, the captured object 4 (partition) is an object newly appearing in the real space, and the "movement flag" for this is set to "1".

In addition, a group number is assigned to the captured object registered in a captured object group described later. For example, in FIG. 18A, the captured object 2 (chair 1) and the captured object 3 (chair 2) are grouped and treated as "group 1".

FIG. 19 shows the background object data 893. The background object data is classified for each shooting position, and is described separately for the reference position (PBase) and the movement position (MP1, . . . ).

If there are feature points, "feature point 1", "feature point 2", . . . , are described in the background object data, and these feature points may include pseudo feature points instructed by the user. Subsequently, the data of "associated AR object" is described as in the case of the captured objects in FIGS. 18A to 18C. In addition, the background object data includes bitmap data corresponding to the coordinates of the image captured by the camera so that the position or the shape can be grasped.

FIG. 20 shows the AR object data 894. The AR object data is, for example, data downloaded from a server on the network, and a serial number is assigned to each title. A data ID for identification is assigned to each piece of AR object data, each piece of AR object data is associated with the captured object data or the background object data described above through the data ID. As items, there are title and description of copyright, and 3D image data is stored. A display image is generated using the 3D image data.

The AR object data may include unique display attributes. For example, "AR object 7" is the case of the drone object 27 in FIG. 6, and a "movement profile" indicating the movement of the drone is described. In addition, the user's association parameter setting can be restricted by specifying the association state (distance to the captured object and the rotation angle of the posture) using the posture profile.

FIG. 21 shows the captured object group data 895. Serial numbers, such as "group 1" and "group 2", are assigned to the captured object group data, and captured objects forming the group are described in "constituent object". In this example, the captured object 2 and the captured object 3 are grouped. Subsequently, "associated AR object" to be associated with each group is described. In addition, "priority" indicating the priority of associating the AR object is assigned to the plurality of captured objects forming the group.

By grouping the plurality of captured objects, the selection of the captured object when displaying the AR object is performed according to the situation. For example, the effect of grouping the two chairs 18 and 19 in FIG. 3B will be described. In the association operation, the stuffed animal object 23 is associated with the chair 18. Thereafter, as shown in FIG. 3C, of the two chairs 18 and 19, the associated chair 18 may be removed from the room. When the chair 18 and the chair 19 are grouped and registered, even if the first-priority chair 18 is removed, the stuffed animal object 23 can be arranged on the second-priority chair 19 with reference to the captured object group data 895. Therefore, the AR object can be displayed flexibly according to the situation in the real space, reflecting the intention of the user who has associated the stuffed animal.

As described above, according to the first embodiment, it is possible to provide the augmented reality display device that appropriately displays the AR object according to the current position of an object including a movable object. In addition, since the 3D display reflecting the distance relationship between the AR object and the real object (that is, the front-and-back relationship viewed from the user) is performed, it is possible to perform display with a sense of depth. In addition, by grouping a plurality of captured objects, it is possible to display the AR object flexibly according to the situation in the real space, reflecting the intention of the user.

Second Embodiment

In a second embodiment, an augmented reality display device having a 3D camera to perform shooting and distance measurement will be described.

FIG. 22 is a diagram showing the appearance of an augmented reality display device (AR display device) according to the second embodiment.

Components having the same functions as in the AR display device 1 shown in the first embodiment (FIG. 1A) are denoted by the same reference numerals, and the repeated description thereof will be omitted. In this case as well, as in FIG. 1B of the first embodiment, the user wears an AR display device', which is an HMD, on his or her head using holders 10a and 10b.

The AR display device 1' includes 3D (three-dimensional) cameras 33a and 33b and a flat display (display) 34. The 3D cameras 33a and 33b replace the camera 2 and the distance measuring sensor 3 in the first embodiment, and can not only obtain the image captured by the camera, but also measure the distance of the real object in the camera image by the difference between the image of the line of sight of the left eye obtained by 33a and the image of the line of sight of the right eye obtained by 33b.

The flat display 34 replaces the 3D projector 5 and the transmissive screen 6 in the first embodiment, and the controller 8 combines captured images of the 3D cameras 33a and 33b and the image of the AR object and displays the composite image on the flat display 34. At this time, the image of the line of sight of the left eye and the image of the line of sight of the right eye are displayed alternately, and the 3D image is displayed in synchronization with the glasses with a shutter 7. In addition, a general-purpose device, such as a smartphone, may be used for the flat display 34. At this time, the function of the controller 8 can be executed by a control device built in the smartphone.

Figure 23:
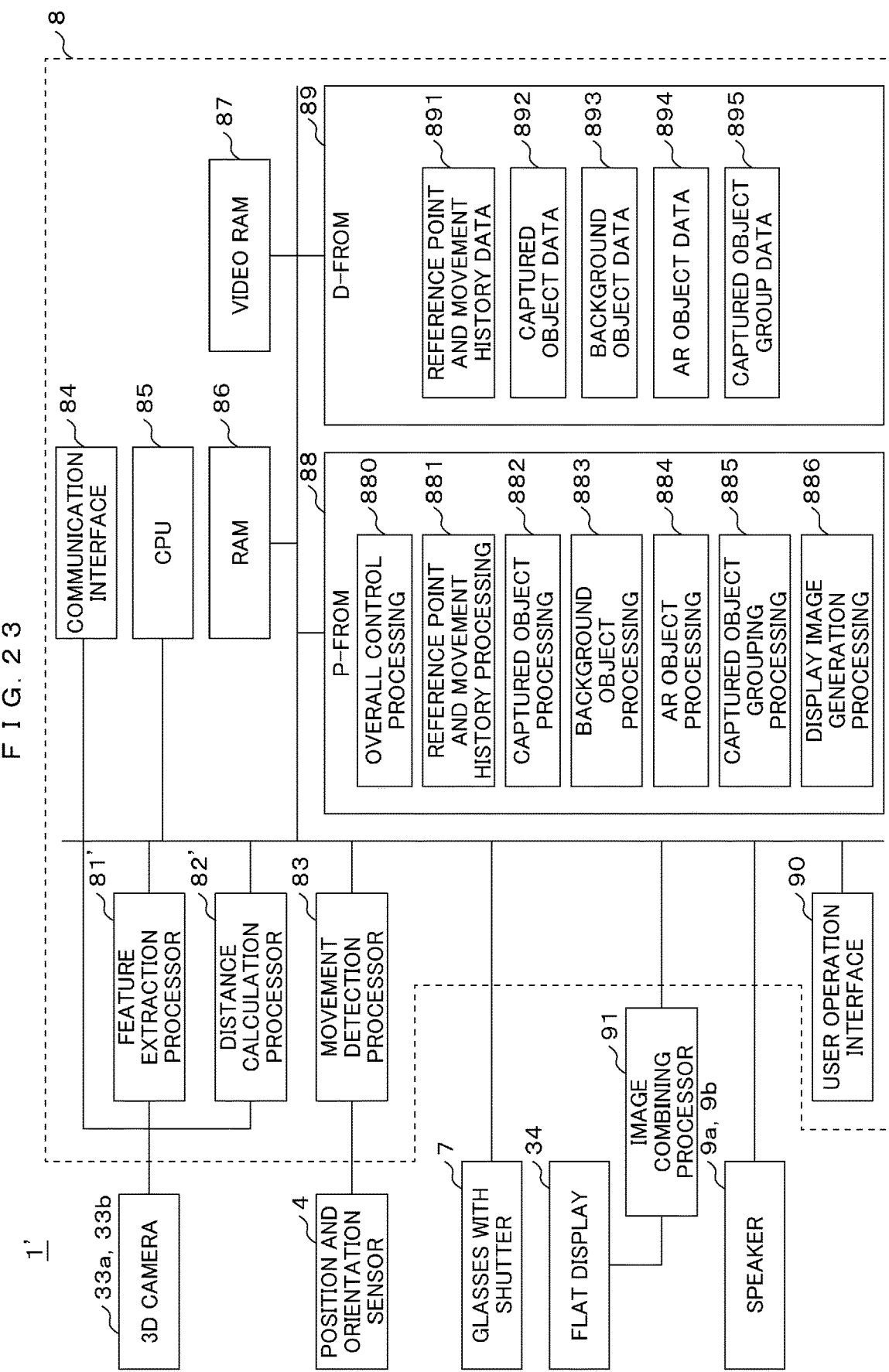
FIG. 23 is a block diagram showing the internal configuration of the AR display device.

FIG. 23 is a block diagram showing the internal configuration of the AR display device 1'. Blocks having the same functions as the blocks shown in the first embodiment (FIG. 2) are denoted by the same reference numerals, and the repeated description thereof will be omitted. Blocks different from the first embodiment are 3D cameras 33a and 33b, a flat display 34, a feature extraction processor 81', a distance calculation processor 82', and a combining processor 91.

The feature extraction processor 81' extracts feature points from the images of the 3D cameras 33a and 33b, and recognizes a real object appearing in the image captured by the camera from the feature points. The distance calculation processor 82' measures the distance of the real object in the camera image by the difference between the image of the line of sight of the left eye obtained by the 3D camera 33a and the image of the line of sight of the right eye obtained by the 3D camera 33b. The combining processor 90 forms the captured images of the 3D cameras 33a and 33b and the image of the AR object, and the flat display 34 displays the composite image.

Also in the AR display device 1' of the second embodiment, the association of the AR object with the real object (captured object and background object) recognized from the captured image and various display control methods of the associated AR object can be performed in the same manner as in the case of the first embodiment.

According to the second embodiment, the same effect as in the first embodiment is obtained, and a general-purpose device such as a smartphone including a flat display can be utilized.

While the embodiments of the present invention have been described above, the present invention is not limited to these, and a part of the configuration of a certain embodiment can be replaced with the configuration of another embodiment, or the configuration of another embodiment can be added.

In addition, it is needless to say that the present invention can be applied not only to the display of the augmented reality (AR) object but also to a device for displaying a mixed reality (MR) object developed from the augmented reality object and a display method thereof.

REFERENCE SIGNS LIST 1, 1' Augmented reality display device (AR display device)
2 Camera
3 Distance measuring sensor
4 Position and orientation sensor
5 3D projector (display)
6 Transmissive screen
7 Glasses with shutter
8 Controller
9a, 9b Speaker
10a, 10b Holder
20, 21, 22, 23, 24a, 24b, 27 AR object
33a, 33b 3D camera
34 Flat display (display)
81, 81' Feature detection processor
82, 82' Distance calculation processor
83 Movement detection processor
84 Communication interface
85 CPU
86 RAM
87 Video RAM
88 Program flash ROM
89 Data flash ROM
90 User operation interface
91 Image combining processor
100 User
880 Overall control processing
881 Reference point and movement history processing
882 Captured object processing
883 Background object processing
884 AR object processing
885 Captured object grouping processing
886 Display image generation processing

The invention claimed is:

1. An augmented reality display device that is worn on a head of a user and displays an augmented reality (AR) object so as to overlap a background image visually recognized by the user, comprising:
a camera configured to capture a background image;
a distance sensor configured to measure a distance to a real object in the background image captured by the camera;
a position and orientation sensor configured to detect a position and a shooting direction of the camera;
a controller configured to recognize a real object from the background image captured by the camera and associate an AR object with the recognized real object;
a display configured to display an image of an AR object; and
a memory configured to store data of the real object and the AR object associated with each other by the controller,
wherein when the controller determines that the real object associated with the AR object has moved based on a measurement result of the distance sensor, the controller controls the display to display the image of the associated AR object at a position according to a current position of the real object,
wherein when recognizing the real object from the background image, the controller stores, in the memory, a region having a unique object shape as a captured object and a region that does not have a unique object shape other than a plane and has a farthest distance or a region whose distance is not measurable as a background object.

2. The augmented reality display device according to claim 1,
wherein the controller obtains a movement history of the augmented reality display device based on a measurement result of the position and orientation sensor and assigns a movement flag, which indicates whether or not the real object is movable, to the real object in consideration of the movement history.

3. The augmented reality display device according to claim 1,
wherein the controller sets a display position, a size, and a direction of the AR object with respect to the real object as display parameters of the AR object arranged on the real object.

4. The augmented reality display device according to claim 1,
wherein, when the AR object to be displayed is arranged behind the real object close to the AR object, the controller causes a hidden portion of the AR object not to be displayed.

5. The augmented reality display device according to claim 1,
wherein the display is a 3D projector that projects an image of the AR object onto a transmissive screen, and
the user is able to visually recognize the background image through the transmissive screen and at the same time is able to visually recognize the AR object on the transmissive screen.

6. The augmented reality display device according to claim 1,
wherein the camera and the distance measuring sensor are 3D cameras capable of capturing the background image and measuring a distance to the real object in the background image, and
the display is a flat display that performs display so that an image of the AR object is combined with the background image captured by the 3D camera.

7. An augmented reality display method for displaying an augmented reality (AR) object so as to overlap a background image visually recognized by a user, comprising:
a step of capturing a background image and recognizing a real object from the captured background image;
a step of storing a region having a unique object shape as a captured object and a region that does not have a unique object shape other than a plane and has a farthest distance or a region whose distance is not measurable as a background object when recognizing the real object from the background image;
a step of measuring a distance to the real object in the background image;
a step of detecting a shooting position and a shooting direction of the background image;
a step of associating an AR object with the recognized real object;
a step of detecting that the real object has moved; and
a step of displaying an image of the associated AR object,
wherein, in the step of displaying the image of the AR object, when the real object associated with the AR object has moved, the AR object is arranged at a position according to a current position of the real object.

8. An augmented reality display method for displaying an augmented reality (AR) object so as to overlap a background image visually recognized by a user, comprising:

a step of capturing a background image and recognizing a real object from the captured background image;

a step of measuring a distance to the real object in the background image;

a step of detecting a shooting position and a shooting direction of the background image;

a step of associating an AR object with the recognized real object;

a step of detecting that the real object has moved; and a step of displaying an image of the associated AR object, wherein the step of associating the AR object with the real object includes a first step in which the real object is selected first and then the AR object to be associated with the real object is selected and a second step in which the AR object is selected first and then the real object to be associated with the AR object is selected, and the first step and the second step are selectable by the user, wherein, in the step of displaying the image of the AR object, when the real object associated with the AR object has moved, the AR object is arranged at a position according to a current position of the real object.

* * * * *